(12) United States Patent
Wada

(10) Patent No.: US 7,770,227 B2
(45) Date of Patent: Aug. 3, 2010

(54) RIGHT INFORMATION MANAGEMENT METHOD AND RIGHT INFORMATION MANAGEMENT DEVICE

(75) Inventor: Hiroyuki Wada, Minoh (JP)

(73) Assignee: Panasonic Corporation, Osaka (JP)

( * ) Notice: Subject to any disclaimer, the term of this patent is extended or adjusted under 35 U.S.C. 154(b) by 1296 days.

(21) Appl. No.: 11/271,860

(22) Filed: Nov. 14, 2005

(65) Prior Publication Data

US 2006/0117013 A1 Jun. 1, 2006

(30) Foreign Application Priority Data

Nov. 26, 2004 (JP) ............................. 2004-342404
Oct. 21, 2005 (JP) ............................. 2005-306940

(51) Int. Cl.
*H04N 7/16* (2006.01)
(52) U.S. Cl. ...................................... 726/26
(58) Field of Classification Search ........................ None
See application file for complete search history.

(56) References Cited

U.S. PATENT DOCUMENTS

2002/0094090 A1* 7/2002 Iino ........................... 380/282

FOREIGN PATENT DOCUMENTS

| CN | 1433608 | 7/2003 |
| JP | 2002-312522 A | 10/2002 |
| WO | WO 01/41356 A1 | 6/2001 |

OTHER PUBLICATIONS

Chinese Office Action, the English translation thereof, issued in Chinese Patent Application No. CN 200510124318.1, mailed Mar. 7, 2008.

* cited by examiner

*Primary Examiner*—Brandon S Hoffman
(74) *Attorney, Agent, or Firm*—McDermott Will & Emery LLP

(57) ABSTRACT

A right information management method for managing a right information of contents retained in a storage medium comprising an authenticated memory region accessible after a mutual authentication is obtained relative to a contents processing device and an ordinary memory region accessible without obtaining the mutual authentication, comprising a step of reading an encrypted right information retained in the authenticated memory region, a step of decoding the read encrypted right information and retrieving a plaintext right information, and a step of retaining the plaintext right information in the ordinary memory region. According to the right information management method, a user can be notified of the contents and the right information of the contents managed in the storage medium in a speedy manner via the contents processing device.

28 Claims, 18 Drawing Sheets

FIG. 8

| title | recording date/time | reproducing time | availability / non-availability of reproduction/ migration/copy | remaining number of approved reproduction/ migration/copy |
|---|---|---|---|---|
| B News | 2004.8.1 | 20min | ○/○/× | ∞/1/0 |
| C Movie | 2004.8.3 | 60min | ○/×/× | 5/0/0 |
| athletic festival | 2004.8.15 | 120min | ○/○/○ | ∞/∞/∞ |
| ... | ... | ... | ... | ... |
|  |  |  |  |  |

FIG. 11

| link information relative to encrypted right information (serial number) | right information | |
|---|---|---|
| | availability (1)/ non-availability (0) of reproduction/ migration/copy | remaining number of approved reproduction/ migration/copy |
| 1 | 1/1/0 | ∞/1/0 |
| 250 | 1/0/0 | 5/0/0 |
| 2047 | 1/1/1 | ∞/∞/∞ |
| ... | ... | |

FIG. 15

| link information relative to encrypted right information (serial number) | availability (1)/ non-availability (0) of reproduction/ migration/copy | remaining number of approved reproduction/ migration/copy |
|---|---|---|
| ? | 1/1/0 | ∞/1/0 |
| 250 | 1/0/0 | 5/0/0 |
| 2047 | ? | ? |
| ... | ... | |

RIGHT INFORMATION MANAGEMENT METHOD AND RIGHT INFORMATION MANAGEMENT DEVICE

FIELD OF THE INVENTION

The present invention relates to a right information management method and a right information management device capable of promptly notifying a user of contents and a right information of the contents managed in a storage medium via a contents processing device. The present invention is particularly effective as a commercial device provided with a function of displaying an encrypted right information in a speedy manner and capable of displaying a list of right informations of a plurality of contents such as TV, DVD recorder, mobile telephone, digital camera and moving image viewer.

BACKGROUND OF THE INVENTION

In recent years, it is increasingly demanded that a copyright of contents be protected. As an increasing trend in response to the demand, contents distributed in digital terrestrial broadcasts and the like include a right information. When the contents are recorded on a storage medium, the right information has to be recorded together with the contents.

The right information includes such important informations for protecting the copyright as availability/non-availability of migration, availability/non-availability of copy, availability/non-availability of reproduction, number of migrations/copies/reproductions, and the like. It becomes increasingly necessary for the contents to be handled based on the respective informations in different devices.

As a conventional method of notifying a contents user of the right information of the contents in association with the contents was proposed an information processing device (for example, see No. 2002-312522 of the Publication of the Unexamined Japanese Patent Applications) in which data of the right information of the relevant contents (whether or not the right information is included, whether or not the right information can be migrated, number of remaining checkouts and the like) is recorded in a right information storing unit, the data is associated with respective music titles in a GUI unit, and an icon corresponding to the data of the right information is displayed on a display so that the user can be notified of conditions for using the contents.

In recent years, it is increasingly promoted to encrypt the right information of the contents and retain the encrypted right information in an authenticated memory region of a recoding medium for retaining the right information of the contents only accessible after a mutual authentication is obtained in order to enhance the protection of the copyright.

Therefore, when the right information is displayed together with the contents and other information of the contents to the users of the respective devices, it becomes necessary to obtain the mutual authentication relative to the storage medium, read the encrypted right information from the authenticated memory region and decode the encrypted right information every time when the right information of the contents is acquired. The foregoing conventional method included such problems that it requires a large amount of time for the user to be notified of the right information and the user is disadvantageously kept waiting until the right information is displayed when the right informations of a plurality of contents are collectively displayed.

SUMMARY OF THE INVENTION

Therefore, a main object of the present invention is to obtain a plaintext right information without obtaining a mutual authentication relative to a storage medium, reading an encrypted right information from an authenticated memory region and decoding the encrypted right information every time when the right information of contents is displayed and notify a user of the right information of the contents in a speedy manner.

Another main object of the present invention is to share the plaintext right information between devices that share the storage medium, prevent the falsification of the right information and guarantee the legitimacy of the right information.

A right information management method as claimed in claim 1 of the present invention is, as shown in FIG. 1, a method of managing a right information of contents retained in a storage medium comprising an authenticated memory region accessible after a mutual authentication is obtained relative to a contents processing device and an ordinary memory region accessible without obtaining the mutual authentication, comprising a step of reading an encrypted right information retained in the authenticated memory region, a step of decoding the read encrypted right information and retrieving a plaintext right information and a step of retaining the plaintext right information in the ordinary memory region.

According to the right information management method recited in claim 1, the plaintext right information retained in the ordinary memory region is read when the right information is displayed to a user of the contents processing device so that the user can be promptly notified of the right information.

A right information management method as claimed in claim 2 of the present invention is the right information management method recited in claim 1, wherein the plaintext right information is encrypted and retained in the ordinary memory region.

According to the right information management method recited in claim 2, there is no longer the risk that a plaintext right information file stored in the ordinary memory region could be read by the user of the contents processing device. Further, the right information can be more promptly displayed because it becomes completely unnecessary to access the authenticated memory region, which is different to a conventional method.

A right information management method as claimed in claim 3 of the present invention is, as shown in FIG. 2, the right information management method recited in claim 1, wherein the ordinary memory region comprises a contents region managed and accessible depending on a usage and a data region capable of retaining data irrespective of the usage, and the contents and a management information of the contents are stored in the contents region and the plaintext right information is retained in the management information in the contents region.

According to the right information management method recited in claim 3, the plaintext right information stored in the ordinary memory region can be stored in a contents folder where the contents to be displayed are also stored, which makes it completely unnecessary to access a user folder/user file when the right information is displayed in association with the contents. As a result, the right information can be swiftly displayed.

A right information management method as claimed in claim 4 of the present invention is, as shown in FIG. 3, the right information management method recited in claim 1, wherein the ordinary memory region comprises a contents region managed and accessible depending on a usage and a data region capable of retaining data irrespective of the usage, the contents and a management information of the contents are retained in the contents region, and the plaintext right information is divided and retained in the data region depending on a usage employed on the contents-processing-device side.

According to the right information management method recited in claim 4, the right information of a particular application can be collected in one plaintext right information file, which accelerates the display of the right information.

A right information management method as claimed in claim 5 of the present invention is the right information management method recited in claim 4, wherein the plaintext right information is divided depending on a type of the contents processing device and retained.

According to the right information management method recited in claim 5, the right information of a particular contents processing device can be collected in one plaintext right information file, which accelerates the display of the right information.

A right information management method as claimed in claim 6 of the present invention is the right information management method recited in claim 4, wherein the plaintext right information is divided depending on a format type of the contents and retained.

According to the right information management method recited in claim 6, the right information of a particular format can be collected in one plaintext right information file, which accelerates the display of the right information.

A right information management method as claimed in claim 7 of the present invention is a method of managing a right information of contents retained in a storage medium comprising an authenticated memory region accessible after a mutual authentication is obtained relative to a contents processing device and an ordinary memory region accessible without obtaining the mutual authentication, wherein the ordinary memory region comprises a contents region managed and accessible based on a usage and a data region capable of retaining data irrespective of the usage, and the contents and a management information of the contents are retained in the contents region, comprising a step of confirming the presence of the contents and a management information of the contents including a link information relative to an encrypted right information in the contents region, a step of reading the encrypted right information retained in the authenticated memory region based on the link information when the presence of the management information is confirmed, a step of decoding the read encrypted right information and retrieving a plaintext right information, and a step of retaining the plaintext right information in the ordinary memory region.

According to the right information management method recited in claim 7, only the right information having the established link information relative to the encrypted right information and effectively processable is displayed to the user of the contents processing device. As a result, the user no longer needs to execute any unnecessary process.

A right information management method as claimed in claim 8 of the present invention is the right information management method recited in claim 1, wherein a hash value of the plaintext right information is retained in a memory region of the contents processing device.

According to the right information management method recited in claim 8, there is no longer the risk that the user of the contents processing device could falsify the plaintext right information file stored in the ordinary memory region, and the right information can be promptly displayed because it becomes completely unnecessary to access the authenticated memory region and decode the encrypted right information.

A right information management method as claimed in claim 9 of the present invention is a method of managing a right information of contents retained in a storage medium comprising an authenticated memory region accessible after a mutual authentication is obtained relative to a contents processing device and an ordinary memory region accessible without obtaining the mutual authentication, comprising a step of reading an encrypted right information retained in the authenticated memory region, a step of decoding the read encrypted right information and retrieving a plaintext right information, a step of confirming a blank region in the storage medium for retaining the plaintext right information, a step of dividing the plaintext right information into a plaintext right information 1 having a size retainable in the storage medium and a plaintext right information 2 when the blank region of the storage medium is insufficient, a step of retaining the plaintext right information 1 in the ordinary memory region, and a step of retaining the plaintext right information 2 in a memory region of the contents processing device.

According to the right information management method recited in claim 9, the plaintext right information file can be created even when the blank region of the storage medium cannot be assured.

A right information management method as claimed in claim 10 of the present invention is, as shown in FIG. 4, a method of managing a right information of contents retained in a storage medium comprising an authenticated memory region accessible after a mutual authentication is obtained relative to a contents processing device and an ordinary memory region accessible without obtaining the mutual authentication, comprising a step of reading an encrypted right information retained in the authenticated memory region, a step of decoding the read encrypted right information and retrieving a plaintext right information, and a step of retaining the plaintext right information in a memory region of the contents processing device.

According to the right information management method recited in claim 10, it becomes unnecessary to read the plaintext right information from the storage medium at a predetermined position therein, which further accelerates the display of the right information.

A right information management method as claimed in claim 11 of the present invention is the right information management method recited in claim 10, wherein the plaintext right information is divided depending on a format type of the contents and retained.

According to the right information management method recited in claim 11, the right information can be fast displayed without searching the right information of the contents having a desired format.

A right information management method as claimed in claim 12 of the present invention is, as shown in FIG. 5, a method of managing a right information of contents retained in a storage medium comprising an authenticated memory region accessible after a mutual authentication is obtained relative to a contents processing device and an ordinary memory region accessible without obtaining the mutual authentication, comprising a step of reading an encrypted right information retained in the authenticated memory region, a step of decoding the read encrypted right information and retrieving a plaintext right information, and a step of retaining the plaintext right information in the authenticated memory region in the form of the plaintext.

According to the right information management method recited in claim 12, there is no longer the risk that the user of the contents processing device could read or falsify the plaintext right information file stored in the authenticated memory region, and it becomes totally unnecessary to decode the encrypted right information, which is different to the conventional method. As a result, the display of the right information can be accelerated.

Right information management methods recited in claims 13 through 15 of the present invention are the right information management method recited in any of claims 3, 4 and 7, wherein the contents region is defined by SD-Video Standards, SD-Audio Standards, SD-Binding Standards and the like of a SD memory card.

The right information management methods recited in claims 16 through 20 of the present invention are the right information management method recited in any of claims 1, 7, 9, 10 and 12, wherein the plaintext right information is renewed in the contents processing device so as to create a renewed plaintext right information, the renewed plaintext right information is encrypted so as to renew the encrypted right information in the authenticated memory region, and the plaintext right information retained in the memory region is renewed based on the renewed plaintext right information.

A right information management device as claimed in claim 21 of the present invention is a device for managing a right information of contents retained in a storage medium comprising an authenticated memory region accessible after a mutual authentication is obtained relative to a contents processing device and an ordinary memory region accessible without obtaining the mutual authentication, comprising a device for reading an encrypted right information retained in the authenticated memory region, a device for decoding the read encrypted right information and retrieving a plaintext right information, and a device for retaining the plaintext right information in the ordinary memory region.

A right information management device as claimed in claim 22 of the present invention is a device for managing a right information of contents retained in a storage medium comprising an authenticated memory region accessible after a mutual authentication is obtained relative to a contents processing device and an ordinary memory region accessible without obtaining the mutual authentication, comprising a device for reading an encrypted right information retained in the authenticated memory region, a device for decoding the read encrypted right information and retrieving a plaintext right information, and a device for retaining the plaintext right information in a memory region of the contents processing device.

A right information management device as claimed in claim 23 of the present invention is a device for managing a right information of contents retained in a storage medium comprising an authenticated memory region accessible after a mutual authentication is obtained relative to a contents processing device and an ordinary memory region accessible without obtaining the mutual authentication, comprising a device for reading an encrypted right information retained in the authenticated memory region, a device for decoding the read encrypted right information and retrieving a plaintext right information, and a device for retaining the plaintext right information in the authenticated memory region in the form of the plaintext.

Right information management methods recited in claims 24 through 28 of the present invention are the right information management method recited in any of claims 1, 7, 9, 10 and 12, wherein specifics of the plaintext right information previously retained in the memory region are compared to specifics of the retrieved plaintext right information obtained by decoding the encrypted right information retained in the authenticated memory region, and the specifics of the plaintext right information in the memory region are renewed based on the retrieved plaintext right information obtained by decoding the encrypted right information retained in the authenticated memory region when the compared specifics are inconsistent with each other.

BRIEF DESCRIPTION OF THE DRAWINGS

The present invention is illustrated be way of example and not limitation in the figures of the accompanying drawings, in which like references indicate similar elements in which:

FIG. 8 is a display of a list of contents right informations according to the first preferred embodiment;

FIG. 11 is a configuration of the plaintext right information file according to the first preferred embodiment;

FIG. 15 shows an inconsistency of a link information with respect to an encrypted right information according to a seventh preferred embodiment of the present invention;

DETAILED DESCRIPTION OF PREFERRED EMBODIMENTS

Figure 1:
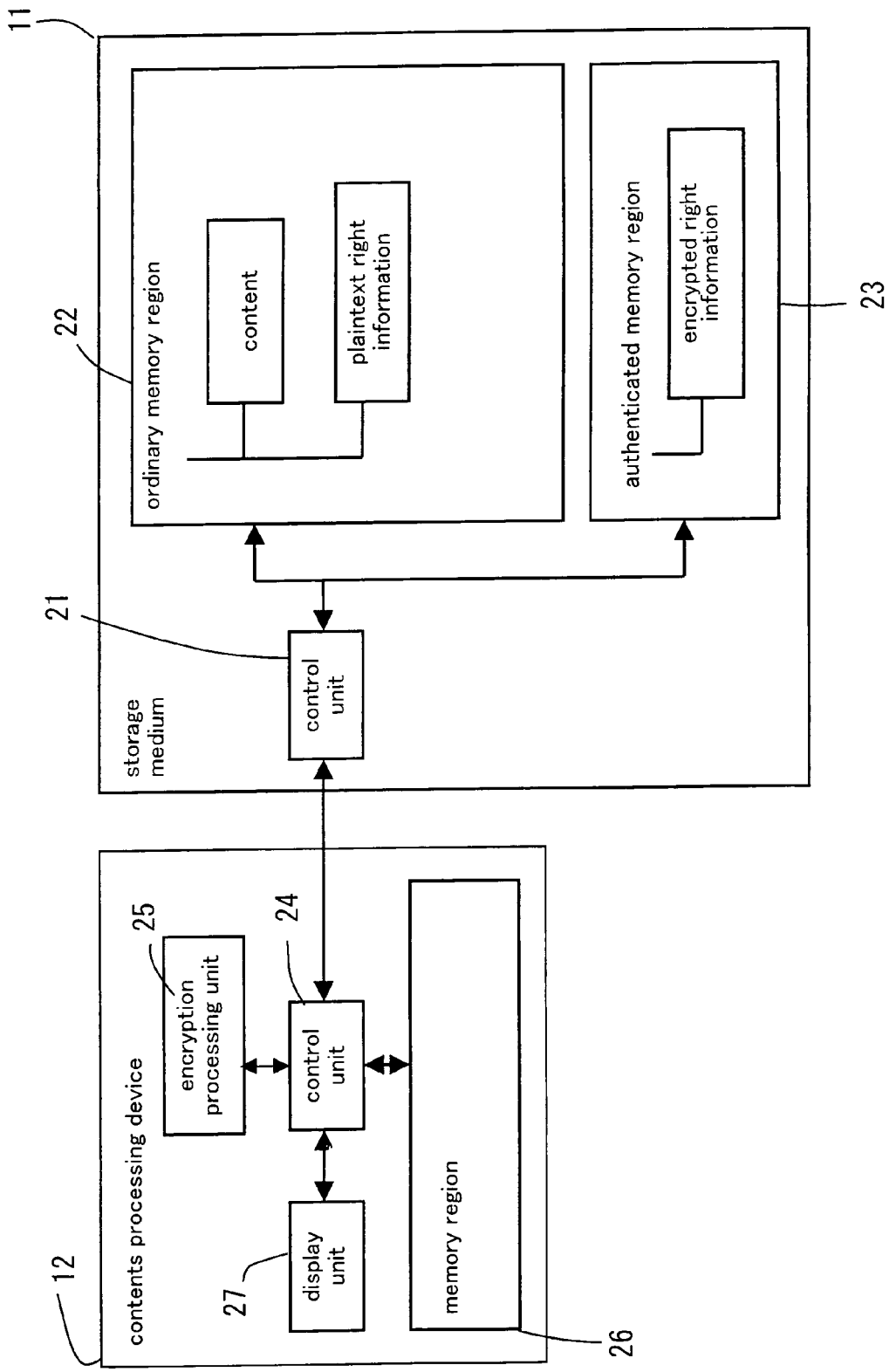
FIG. 1 is a block diagram illustrating a contents right information management method according to claim 1 of the present invention.

Hereinafter, preferred embodiments of the present invention are described referring to the drawings.

First Preferred Embodiment

A first preferred embodiment of the present invention is described referring to the drawings.

Figure 6:
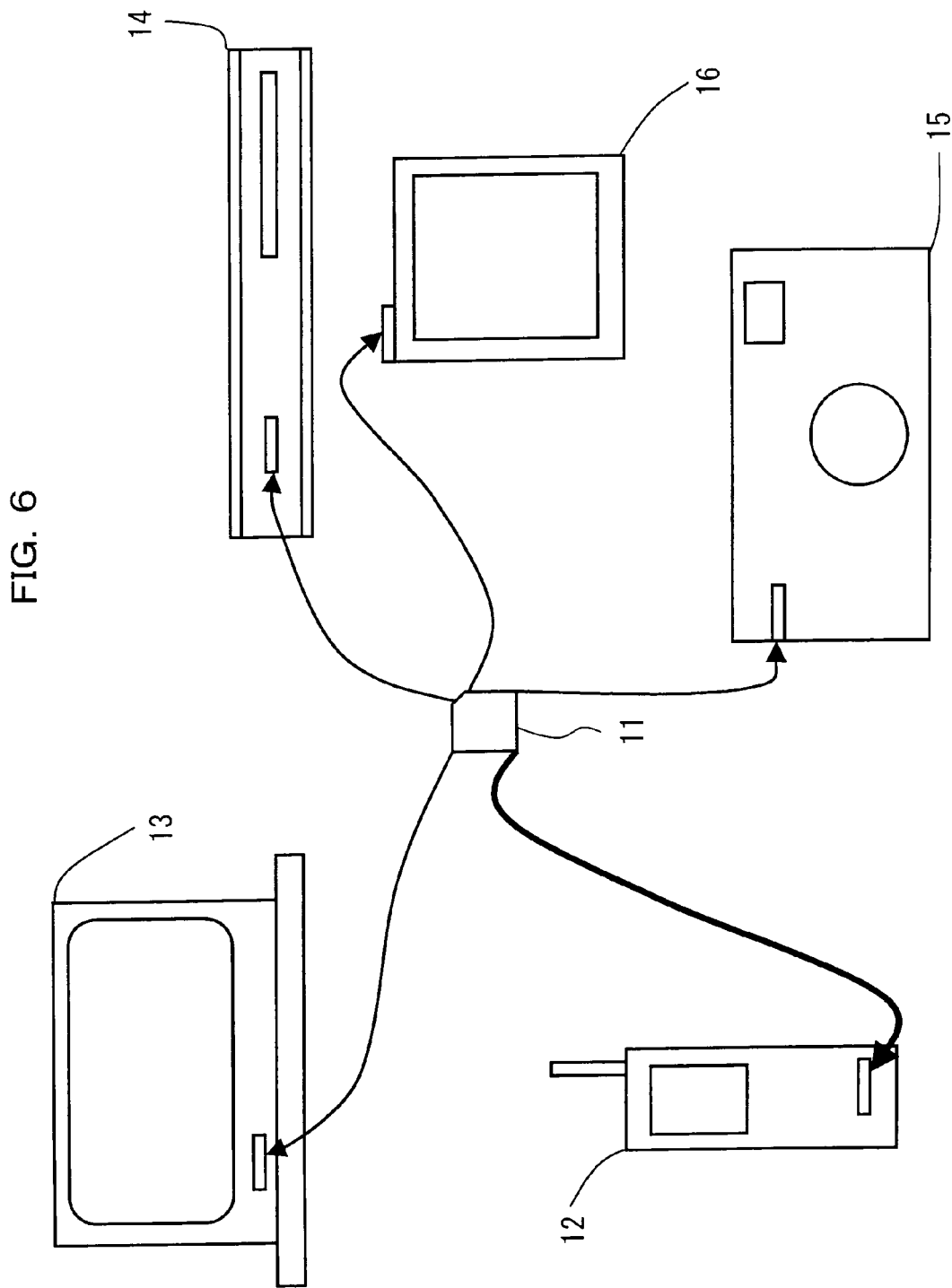
FIG. 6 shows a configuration of a contents right information display system according to a first preferred embodiment of the present invention.

First, a configuration of a contents right information display system is described based on FIG. 6.

In FIG. 6, a memory card 11 is used as an example of a storage medium in the description below, however, it is not that a right information management method according to the present embodiment can only be realized by the memory card 11. Any other storage medium, such as DVD, HDD and RAM, can be used instead.

A mobile telephone 12 is used as an example of a contents processing device in the description below, however, it is not that the right information management method according to the present embodiment can only be realized by the mobile telephone 12, and any other commercial device can be alternatively used. Examples of the commercial device include contents processing devices such as a television 13, DVD recorder 14, digital camera 15 and moving image viewer 16.

FIG. 1 is a block diagram illustrating the contents right information management method according to the first preferred embodiment.

Figure 7:
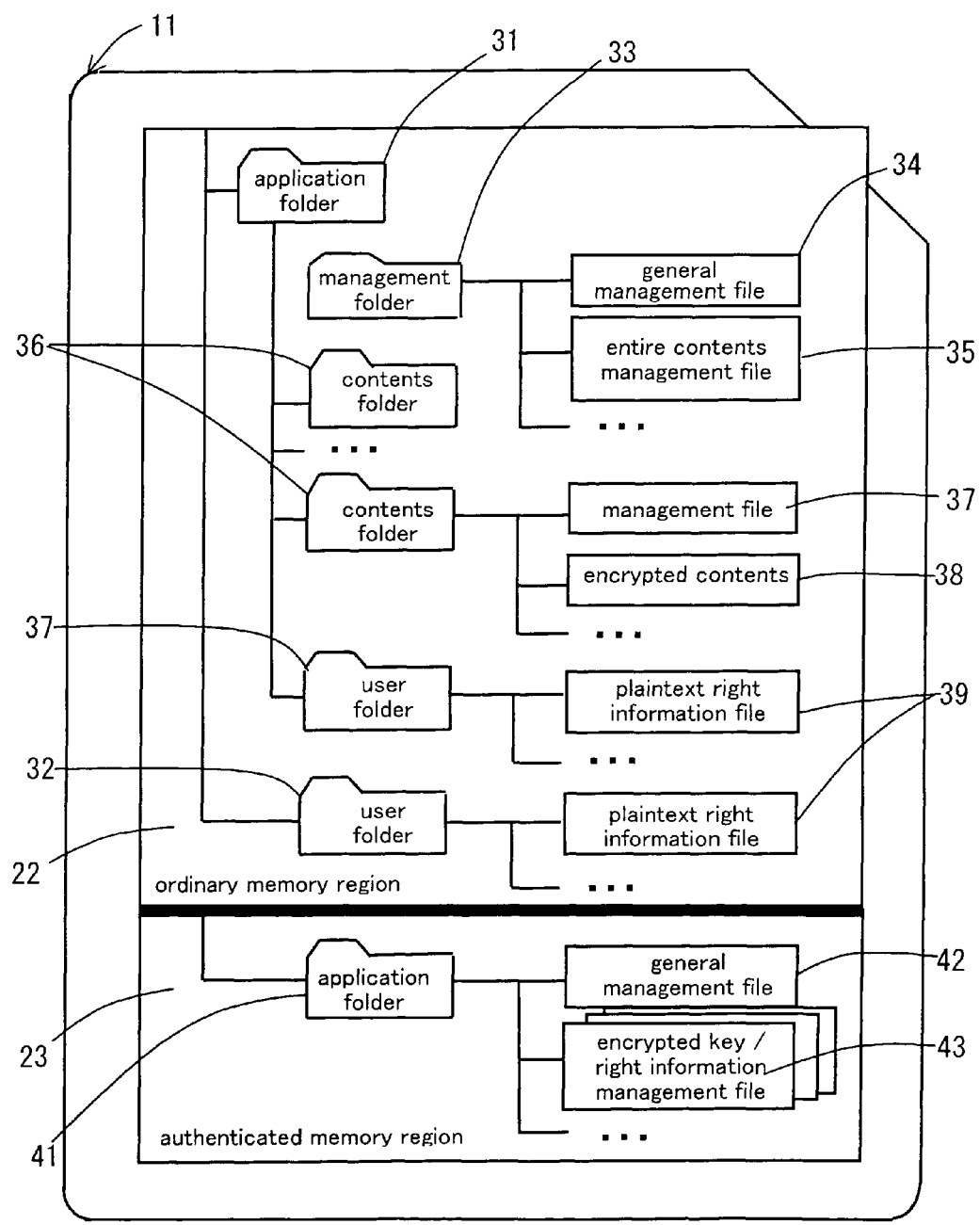
FIG. 7 shows a configuration of a file in a memory card according to the first preferred embodiment.

The memory card 11 comprises a control unit 21, an ordinary memory region 22 and an authenticated memory region 23. The control unit 21 controls data input/output with respect to the ordinary memory region 22 and the authenticated memory region 23 in response to requests for read and write of the data received from the mobile telephone 12. FIG. 7 shows details of the configuration of the memory card 11.

The mobile telephone 12 comprises a control unit 24, an encryption processing unit 25, a memory region 26 and a display unit 27. Any other component, which is not directly relevant to the present invention, is neither shown nor described here. The control unit 24 controls read/write of data from an external storage medium and further controls an authentication process and internal blocks. The encryption processing unit 25 encrypts/decodes a data designated by the control unit 24. The memory region 26 is a region where the data designated by the control unit 24 is memorized. The display unit 27 displays the data designated by the control unit 24 on a screen.

FIG. 7 shows a configuration of a file in the memory card 11.

The memory card 11 is, for example, a SD memory card (trademark), and managed in a folder/file configuration corresponding to the SD_Video Standards. However, the memory card 11 is not limited to the SD memory card according to the SD_Video Standards, and may conform to any of other applied standards of the SD card such as the SD-Audio Standards and SD-Binding Standards, or may conform to standards provided for various storage media.

In the file configuration shown in FIG. 7, a region accessible without obtaining a mutual authentication is referred to as the ordinary memory region 22, while a region only accessible after the mutual authentication is obtained is referred to as the authenticated memory region.

The ordinary memory region 22 includes an application folder 31 and a user folder (data region) 32 that can be used by a user without any restriction. Further, the application folder 31 includes a management folder (contents region) 33 for storing a general management file 34 and an entire contents management file 35, contents folders (contents region) 36 for managing a plurality of contents as a unit and a user folder (data region) 37 that can be freely used by the user. A management file 37 and an encrypted contents 38 are stored in the contents folder 36, and a plaintext right information file 39 is stored in the user folders 32 and 37.

The authenticated memory region 23 comprises an application folder 41 in which a general management file 42 and an encrypted key/right information management file 43 for retaining a plurality of encrypted keys and encrypted right information are stored.

The file configuration described here is a mere example, number, sizes and roles of the management files are not limited to the illustration in the drawing.

In the first preferred embodiment, contents and a list of right informations stored in the memory card 11 are speedily displayed on the display unit 27 of the mobile telephone 12 as shown in FIG. 8. Below is described in detail the contents right information management method. The contents right information management method is described in three steps, which are: generation of the plaintext right information file; display based on the plaintext right information file; and renewal of the plaintext right information.

Figure 9:
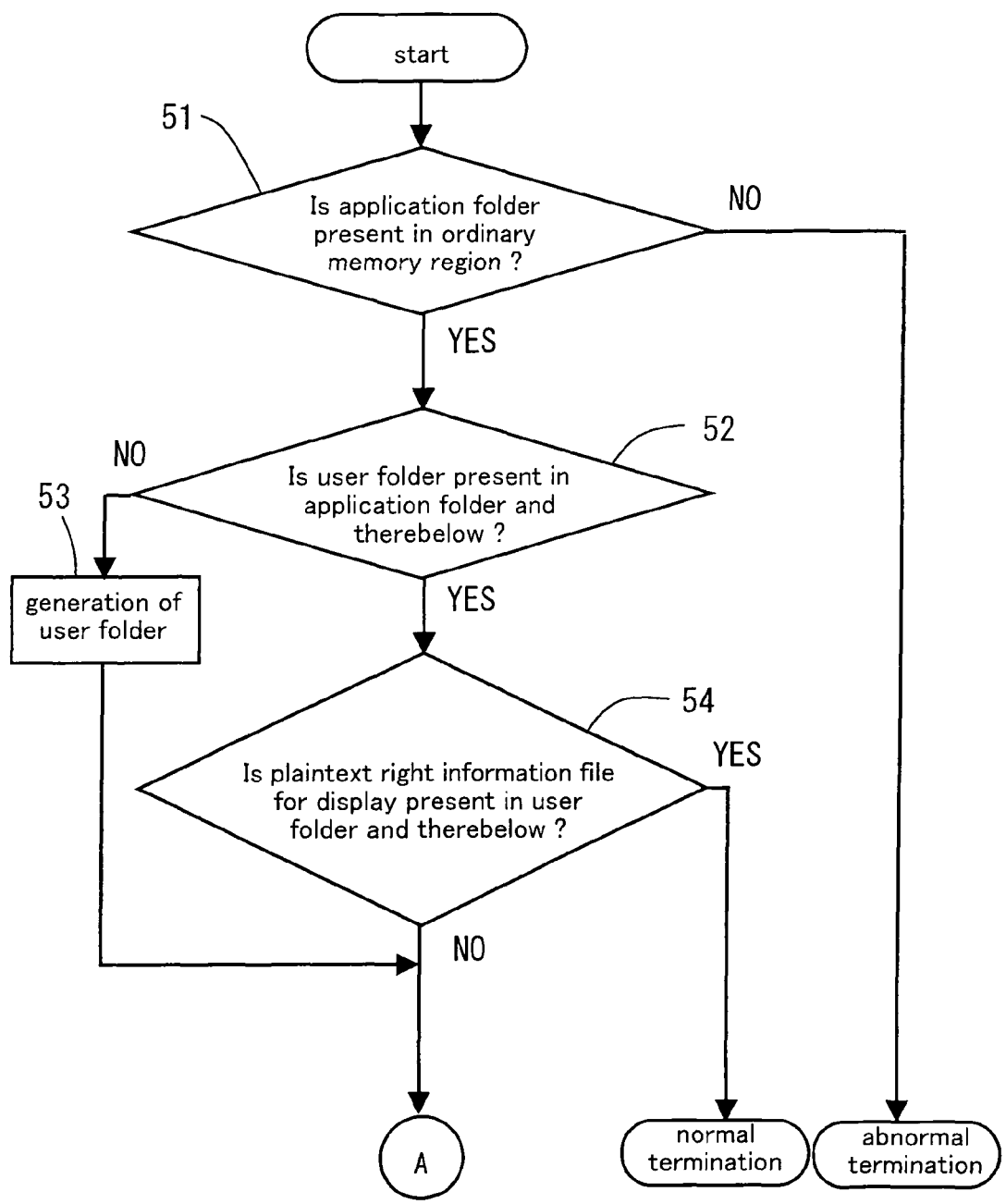
FIG. 9 is a flow chart of presence check when a plaintext right information file according to the first preferred embodiment is generated.
Figure 10:
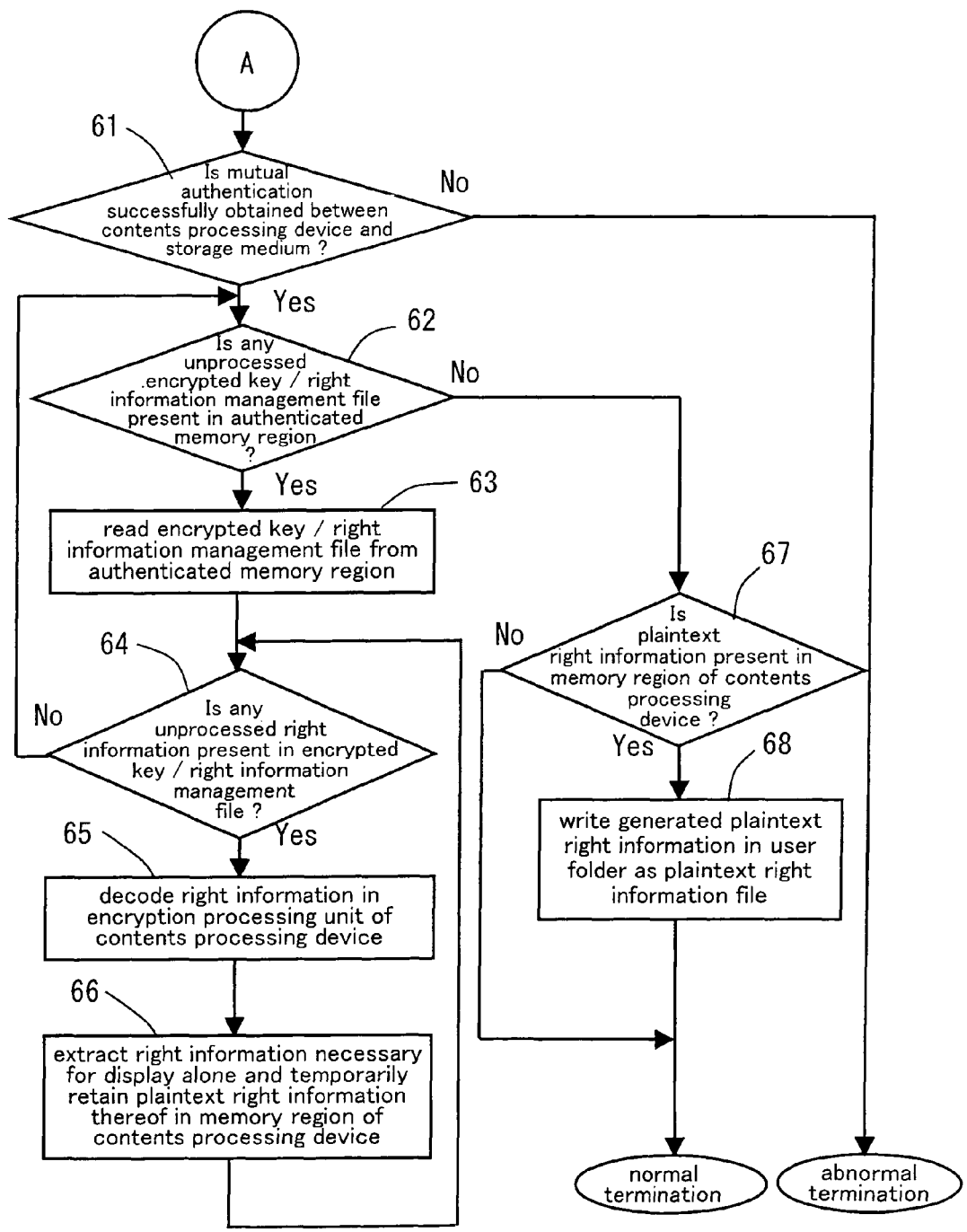
FIG. 10 is a flow chart of generating the plaintext right information file according to the first preferred embodiment.

First, a flow of generating the plaintext right information file is described referring to a flow chart of presence check when the plaintext right information is generated and a flow chart of the generation of the plaintext right information file shown in FIGS. 9 and 10.

The foregoing processes are executed, for example, when the memory card 11 is inserted into the mobile telephone 12, when an application is activated in the mobile telephone 12, and many other possible situations. The foregoing processes may be executed depending on the contents processing device or at an optional timing.

First is described the presence checking process with respect to the plaintext right information file shown in FIG. 9.

When the generation of the plaintext right information file on the memory card 11 is requested by the mobile telephone 12, the presence/absence of the application folder 31 in the ordinary memory region 22 on the memory card 11 is first checked (Step 51). In the Step 51, the process is immediately terminated as an abnormal error in the absence of the application folder 31, while the process advances to Step 52 in the presence of the application folder 31. In the Step 52, the presence/absence of the user folder 37 in the application folder 31 and therebelow is checked, and a new user folder is generated in the absence of the user folder 37 (Step 53). Though it is stated above that the presence of the user folder 37 in the application folder 31 and therebelow is checked, however, the user folder 37 may be present in a root directory and therebelow in the same manner as the user folder 32. Further, the application folder 31 and the user folder in the root directory and therebelow may have any optional folder name other than reserved titles defined in the standards.

When it is confirmed that the user folder 37 is already present in the Step 52, the process advances to Step 54. In the Step 54, the presence/absence of the plaintext right information file 39 to be displayed in the user folder 37 and therebelow is checked. In response to the confirmation that the plaintext right information file 39 is present, which makes it unnecessary to generate it, the process is normally terminated. It is stated above that the presence of the plaintext right information file 39 in the user folder 37 and therebelow is checked, however, may not be present in the user folder 37. Further, sub folders may be generated in a number of hierarchies so that the plaintext right information file 39 is stored in the sub folders and therebelow. Further, the plaintext right information file 3 is described above. However, the plaintext right information may not necessarily be formed into a file, and may be stored in a region of any other file or in any optional part.

Next, the generation of the plaintext right information file shown in FIG. 10 is described.

When the absence of the plaintext right information file 39 is confirmed in the Step 54 (FIG. 9), the mutual authentication defined in the Standards is carried out between the mobile telephone 12 and the memory card 11 so as to check the legitimacy of the memory card 11 (Step 61). When it is confirmed that the memory card 11 is not legitimate in the Step 61, the process is immediately interrupted as the abnormal error. When it is confirmed that the memory card 11 is legitimate in the Step 61, the process advances to Step 62 so as to check the presence/absence of any unprocessed encrypted key/right information management file 43 in the authenticated memory region 23 of the memory card 11. When the presence of the unprocessed encrypted key/right information management file 43 is confirmed in the Step 62, the process advances to Step S63 so as to read the relevant encrypted key/right information management file 43 into the memory region 26 via the control unit 24 of the mobile telephone 12. At the time, the entirety of the encrypted key/right information management file 43 file may not necessarily be read but may be divided into appropriate sizes and thereby read. When the unprocessed encrypted key/right information management file 43 is not at all present, there is no particular process to be executed.

When the encrypted key/right information management file 43 can be normally read in the Step 63, an effective encrypted key/right information in the encrypted key/right information management file 43 is checked by the control unit 24 of the mobile telephone 12. In the absence of the effective encrypted key/right information, the process is terminated. In the presence of the effective encrypted key/right information, the process advances to Step 64 so as to check the presence/absence of any unprocessed encrypted right information in the effective encrypted key/right information. When the presence of the unprocessed encrypted right information is confirmed in the Step 64, the process advances to Step 65 so as to decode the encrypted right information and retrieve the plaintext right information using the encryption processing unit 25 of the mobile telephone 12. Further, only the right information to be necessarily displayed is retrieved from the plaintext right information, and the plaintext right information from which the necessary right information is retrieved is retained in the memory region 26 of the mobile telephone 12 in the form of a group of plaintext right informations (Step 66).

Described above is the process of obtaining the plaintext right information. FIG. 11 shows an example of a structure of the retained data. In the example, the link information with respect to the encrypted right information and the plaintext right information are managed as a pair of informations, however, the present embodiment is not limited to the example. The plaintext right information shown here includes availability/non-availability of reproduction/migration/copy and number of reproductions/migrations/copies, however, may include the plaintext right information other than the mentioned above.

In the foregoing description, the plaintext right information is not written in the memory card 11 and retained in the memory region 26 of the mobile telephone 12 until a plurality of groups of plaintext right informations are collected, however, may be immediately written in the memory card 11.

Next, the presence/absence of any other effective encrypted key/right information in the encrypted key/right information management file 43 is checked, and the plaintext right information is continuously acquired as described until all of the encrypted right informations are acquired so that the groups of plaintext right informations in the memory region 26 of the mobile telephone 12 are repeatedly renewed and retained. Further, in the presence of any other encrypted key/right information management file 43, the relevant encrypted key/right information management file 43 is read, and the plaintext right information is obtained as described so that the groups of plaintext right informations in the memory region 26 of the mobile telephone 12 are repeatedly renewed and retained. The foregoing process of obtaining the plaintext right information is repeated until the plaintext right information is obtained from all of the encrypted key/right informations and all of the encrypted key/right information files 43.

When the repeated process is finally completed, the process advances to Step 67, in which all of the groups of plaintext right informations retained in the memory region 26 of the mobile telephone 12 are compiled into one plaintext right information file 39 in the presence of the plaintext right information in the memory region 26 of the mobile telephone 12, and recorded in the user folder 37 in the application folder 31 and therebelow of the memory card 11 via the control unit 24 of the mobile telephone 12 (Step 68).

In the foregoing description, all of the encrypted key/right information files 43 and all of the encrypted key/right informations are processed, and all of the plaintext right informations are retained in the memory region 26 of the mobile telephone 12 and then written in the user folder 37 of the memory card 11 as one plaintext right information file 39. However, all of the right informations are not necessarily processed. The number of the encrypted key/right informations to be processed may be reduced depending on the memory region 26 of the mobile telephone 12 or the number of the encrypted key/right informations required for the display, or the plaintext right information file may be divided and then written in the memory card 11.

The file name and structure of the plaintext right information file 39 is not subjected to any particularly regulation and left totally optional. When the file name and the structure are regulated based on a particular and common unit, the plaintext right information can be shared between the devices that share the memory card 11. The plaintext right information file 39 recorded in the foregoing description, which is stored in the ordinary memory region 22 of the memory card 11, could be modified or falsified by the user. However, the plaintext right information file 39 is the right information only for the purpose of the display. When the right information is actually modified, the encrypted key/right information of the authenticated memory region 23 is necessarily used, which does not include any disadvantage in terms of security.

Figure 12:
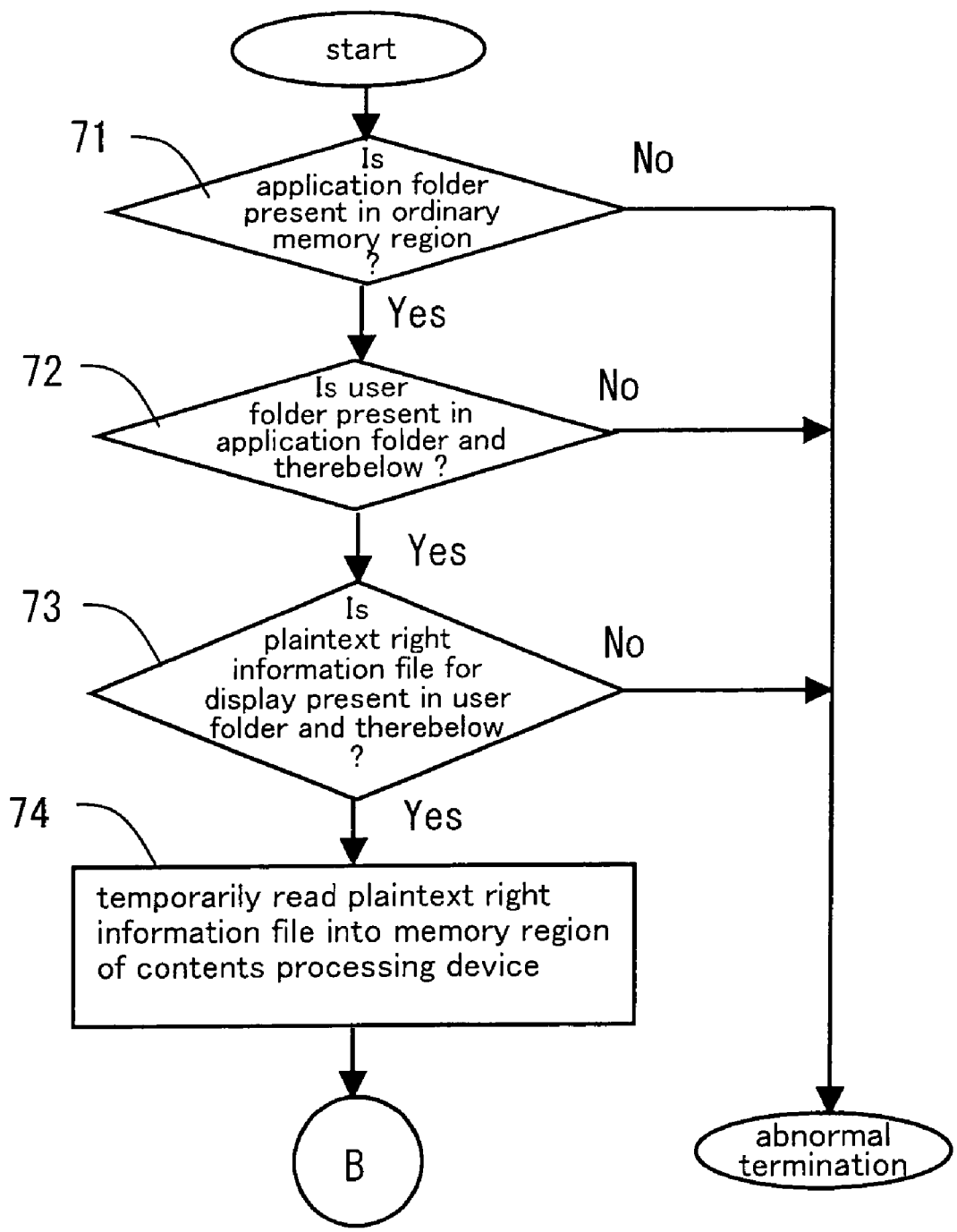
FIG. 12 is a flow chart of presence check when the plaintext right information file according to the first preferred embodiment is displayed.
Figure 13:
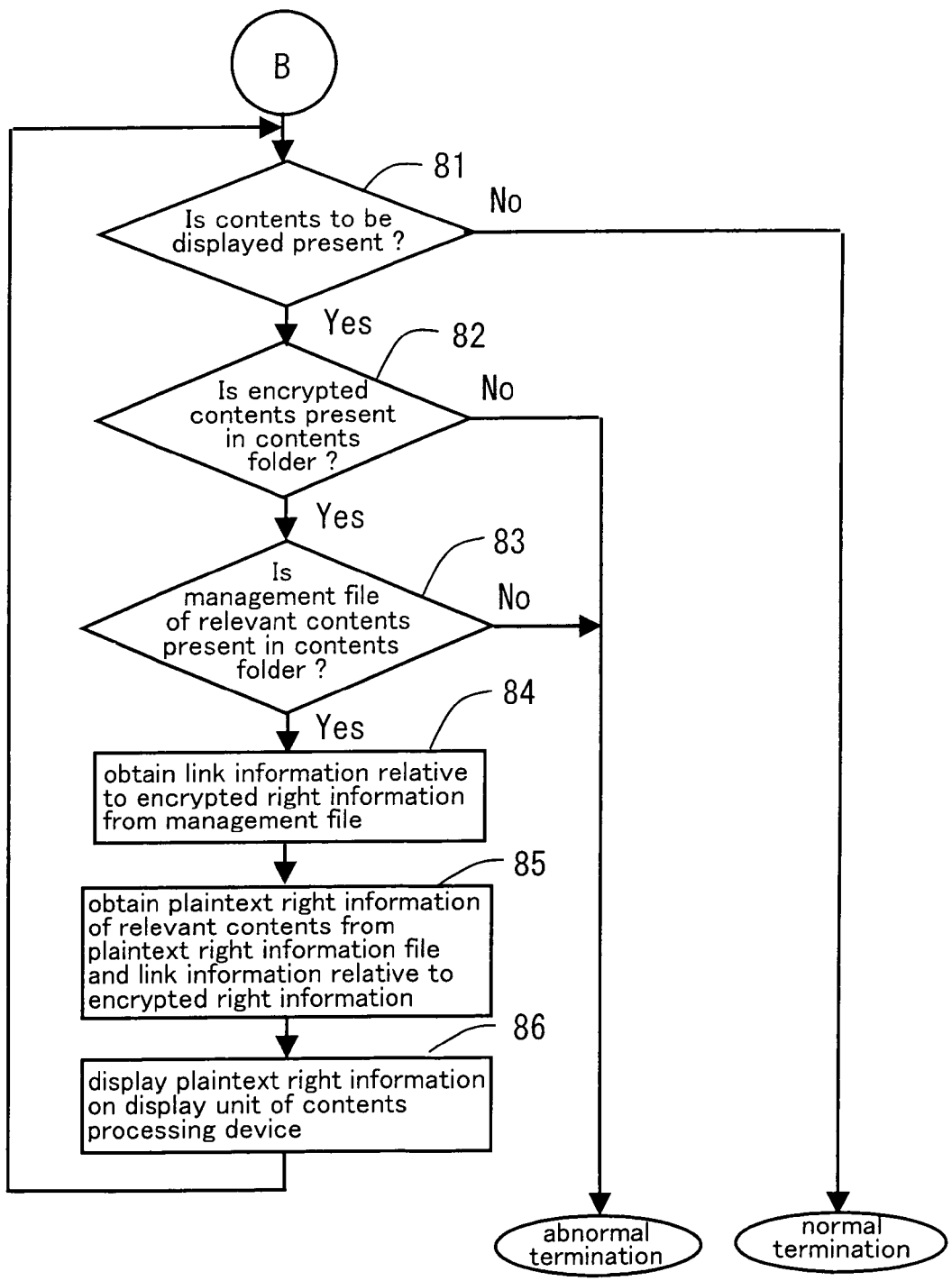
FIG. 13 is a flow chart of displaying the plaintext right information file according to the first preferred embodiment.

Next, a flow of display of the plaintext right information file is described based on a flow chart of presence check when the plaintext right information file is displayed and a flow chart of displaying the plaintext right information file shown FIGS. 12 and 13.

First, the process of checking the presence of the plaintext right information is described referring to FIG. 12.

When the display of the plaintext right information file is requested by the mobile telephone 12 with respect to the memory card 11, first, the presence/absence of the application folder 31 in the ordinary memory region 22 of the memory card 11 is checked (Step 71), and the process is terminated after the abnormality is notified in the absence of the application folder 31. When it is confirmed that the application folder 31 is present in the Step 71, the presence/absence of the user folder 37 in the application folder 31 and therebelow is checked (Step 72), and the process is terminated after the abnormality is notified in the absence of the user folder 37.

When it is confirmed that the user folder 37 is already present in the Step 72, the presence/absence of the plaintext right information file 39 for the display in the user folder 37 and therebelow is checked (Step 73), and the process is terminated after the abnormality is notified in the absence of the plaintext right information 39. Alternatively, the plaintext right information file is generated again based on the process of generating the plaintext right information file shown in FIG. 10. When it is confirmed that the plaintext right information file 39 is present in the Step 73, the plaintext right information file 39 is temporarily read into a non-volatile memory region of the mobile telephone 12 (Step 74).

Next is described the process of displaying the plaintext right information file shown in FIG. 13.

The presence/absence of the contents to be displayed is checked in Step 81. Then, the process is terminated when there are no contents to be displayed, while the process advances to Step 82 when the contents to be displayed are present. It is checked whether or not the encrypted contents 38 to be displayed are present in the contents folder 36 in the Step 82, and the process is terminated in response to the judgment of the abnormality error when the absence of the encrypted contents 38 is confirmed because a link to the right information cannot be obtained.

When the presence of the encrypted contents 38 to be displayed is confirmed in the Step 82, the process advances to the Step 83, and it is checked whether or not the management file 37 for managing the relevant contents is present in the contents folder 36 and whether or not the entire contents management file 35 is present in the management folder 33. When the management file necessary for obtaining the link information relative to the encrypted right information is not present in the management file 37 and the entire contents management file 35, the process is terminated in response to the judgment of the abnormality error.

When the necessary management file is present, the relevant management file is read into the memory region 26 via the control unit 24 of the mobile telephone 12, and it is checked whether or not the link information relative to the encrypted right information to be stored in the management file is present (Step 84). The process is terminated in response to the judgment of the abnormality error in the absence of the link information concerning the encrypted right information.

When it is confirmed that the link information with respect to the encrypted right information is present in the Step 84, the plaintext right information corresponding to the link information with respect to the encrypted right information is obtained from the plaintext right information file 39 previously read into the non-volatile memory region via the control unit 24 of the mobile telephone 12 (Step 85). Next, the obtained plaintext right information is displayed on the screen via the display unit 27 of the mobile telephone 12 so that the user is notified of the right information (Step 86). When the display process is repeated as many times as the number of the necessary contents, the right information of the contents as shown in FIG. 8 can be displayed on the screen of the mobile telephone 12.

The foregoing display process eliminates the need to carry out the mutual authentication for accessing the authenticated memory region 23 and decode the encrypted right information per contents in comparison to the conventional manner of displaying the right information so that the user can be fast notified of the right information. When the plaintext right information file 39 is once generated and stored in the ordinary memory region 22, the memory card 11 can be used for, other than the mobile telephone 12, the television 13, DVD recorder 14, digital camera 15, moving image viewer 16 and any other contents processing device. As a result, the user can confirm the right information in a speedy manner.

Figure 14:
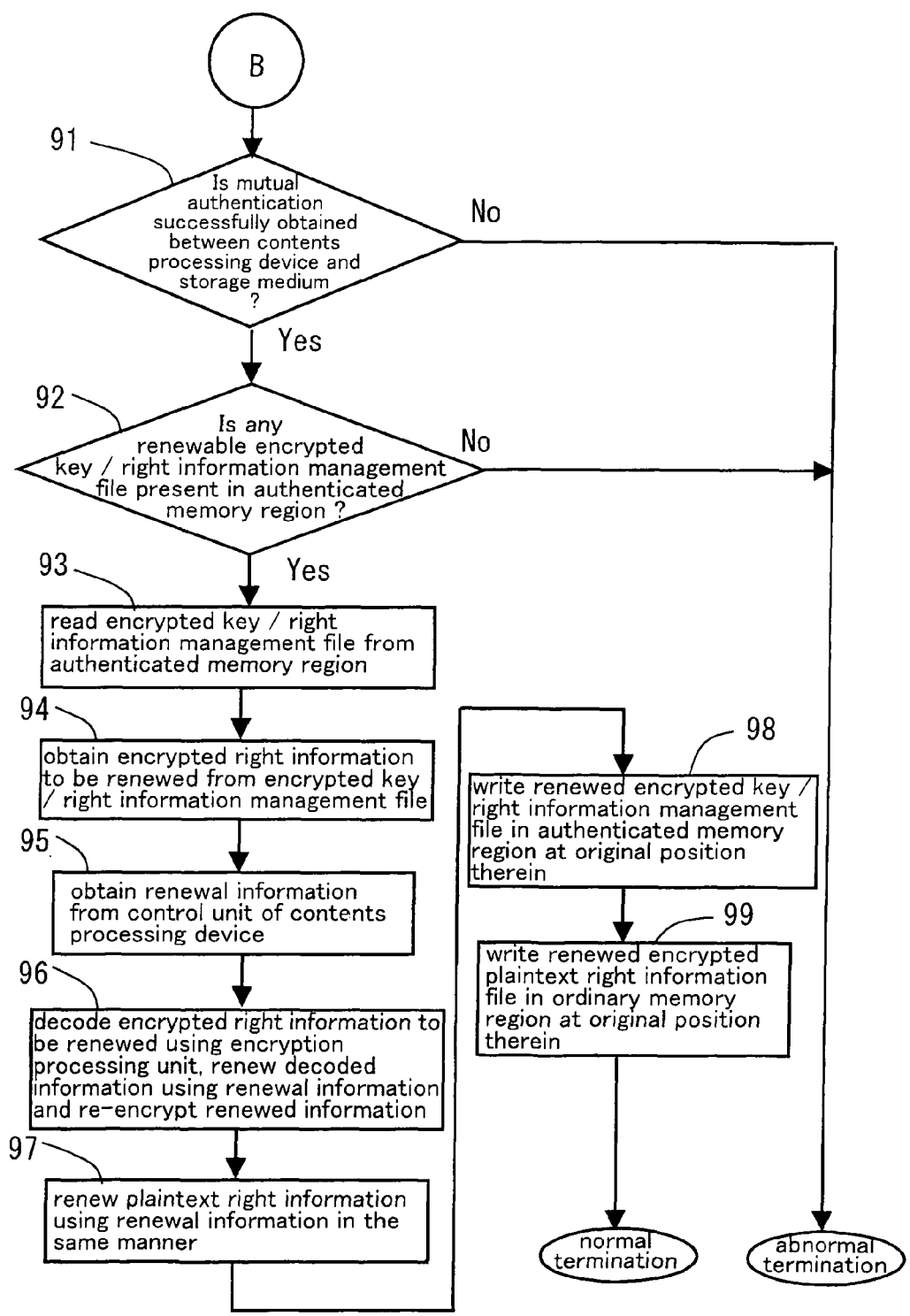
FIG. 14 is a flow chart of renewing the plaintext right information file according to the first preferred embodiment.

Finally, a flow of renewing the plaintext right information file shown in FIG. 14 is described.

Since the process of checking the presence of the plaintext right information file 39 shown in FIG. 12 was already described, only the following process is described based on the premises that the plaintext right information file 39 was normally read into the non-volatile region of the mobile telephone 12.

In Step 91, the mutual authentication process defined in the Standards is carried out between the mobile telephone 12 and the memory card 11 so that the memory card 11 is confirmed to be legitimate. When the memory card 11 is judged not to be legitimate, the process is immediately interrupted and terminated as the abnormality error. When it is confirmed that the memory card 11 is legitimate in the Step 91, the process advances to Step 92. In the Step 92, it is checked whether or not the renewable encrypted key/right information management file 43 is present in the authenticated memory region 23. In the absence of the renewable encrypted key/right information management file 43, the process is immediately interrupted and terminated as the abnormality error. When the presence of the renewable encrypted key/right information management file 43 is confirmed in the Step 92, the encrypted key/right information management file 43 to be desirably renewed stored in the authenticated memory region 23 of the memory card 11 is read into the memory region 26 via the control unit 24 of the mobile telephone 12 (Step 93).

When the encrypted key/right information management file 43 is normally read in the Step 93, the encrypted key/right information to be renewed in the encrypted key/right information management file 43 is confirmed by the control unit 24 of the mobile telephone 12 (Step 94). In the absence of the encrypted key/right information to be renewed, the process is terminated. The encrypted key/right information to be renewed, if present, is retrieved into the memory region 26 of the mobile telephone 12. As an additional step, an necessary renewal information is obtained via the control unit 24 of the mobile telephone 12 (Step 95). The encryption processing unit 25 of the mobile telephone 12 is used so as to decode the encrypted right information of the encrypted key/right information and retrieve the plaintext right information. The retrieved plaintext right information is renewed based on the renewal information so as to generate a renewed plaintext right information. The renewed plaintext right information is encrypted using the encryption processing unit 25 again so that the renewed encrypted key/right information file is renewed (Step 96). In the same manner, the plaintext right information file already read into the non-volatile region of the mobile telephone 12 is renewed based on the renewal information so as to generate a renewed plaintext right information file (Step 97). The renewed encrypted key/right information file is written in the authenticated memory region 23 at an original position therein (Step 98), and the renewed plaintext right information file is written in the ordinary memory region 22 at an original position therein (Step 99).

When the encrypted key/right information management file and the plaintext right information file are simultaneously renewed, the actual right information in the encrypted key/right information management file and the plaintext right information for the display can always be consistent with each other.

Second Preferred Embodiment

A second preferred embodiment of the present invention is described.

The second preferred embodiment is different to the first preferred embodiment only in that the plaintext right information file is encrypted and retained.

The second preferred embodiment is more specifically different to the first preferred embodiment in the generation, display and renewal of the plaintext right information file in the following manner.

Referring to the generation of the plaintext right information file, the Step 68 of the flow chart shown in FIG. 10, that is "the generated plaintext right information is written in the user folder as the plaintext right information file" is replaced by "the generated plaintext right information is encrypted using a key information held by the contents processing device and written in the user folder as an encrypted right information file".

Referring to the display of the plaintext right information file, the Step 74 of the flow chart shown in FIG. 12, that is "the plaintext right information file is temporarily read into the memory region of the contents processing device" is replaced by "the encrypted right information file is temporarily read into the memory region of the contents processing device and decoded using the key information held by the contents processing device.

Referring to the renewal of the plaintext right information file, the Step 99 of the flow chart shown in FIG. 14, that is "the renewed plaintext right information file is written in the ordinary memory region at the original position therein" is replaced by "the renewed plaintext right information file is encrypted using the key information held by the contents processing device and written in the ordinary memory region at the original position therein".

Referring to the key information held by the contents processing device mentioned above, the key information may be specific to the contents processing device or defined between the devices sharing the encrypted right information file.

The foregoing processes advantageously eliminate the risk that the user of the mobile telephone 12 could read the plaintext right information file 39 stored in the ordinary memory region 22 in addition to the effect achieved in the first preferred embodiment. Further, the right information can be promptly displayed since it becomes totally unnecessary to access the authenticated memory region 23, which was required in the conventional method.

Third Preferred Embodiment

Figure 2:
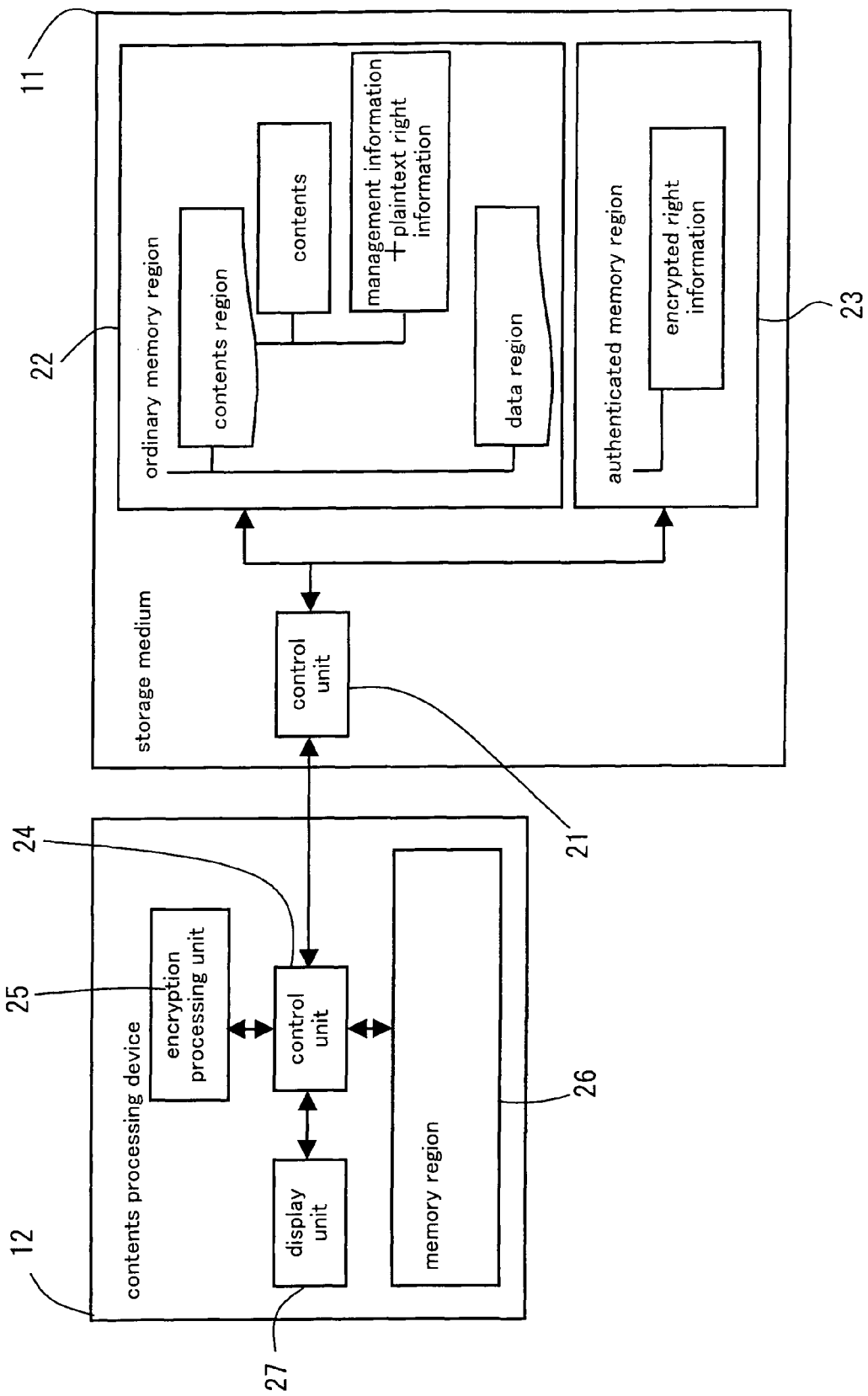
FIG. 2 is a block diagram illustrating a contents right information management method according to claim 3 of the present invention.

A third preferred embodiment of the present invention is described. The third preferred embodiment corresponds to FIG. 2.

The third preferred embodiment is different to the first preferred embodiment only in that the plaintext right information file is stored, not in the user folder, but in the contents folder or the management file in the contents folder.

The third preferred embodiment is more specifically different to the first preferred embodiment in the generation, display and renewal of the plaintext right information file in the following manner.

Referring to the generation of the plaintext right information file, the Step 68 of the flow chart shown in FIG. 10, that is "the generated plaintext right information is written in the user folder as the plaintext right information file" is replaced by "the generated plaintext right information is written in the contents folder or the management file stored in the contents folder as the plaintext right information file".

Referring to the display of the plaintext right information file, the Step 74 of the flow chart shown in FIG. 12, that is "the plaintext right information file is temporarily read into the memory region of the contents processing device" is replaced by "the plaintext right information file is temporarily read from the contents folder or the management file stored in the contents folder into the memory region of the contents processing device".

Referring to the renewal of the plaintext right information file, the Step 99 of the flow chart shown in FIG. 14, that is "the renewed plaintext right information file is written in the ordinary memory region at the original position therein" is replaced by "the renewed plaintext right information is written in the contents folder or the management file stored in the contents folder at the original position therein".

The foregoing processes advantageously allow the plaintext right information stored in the ordinary memory region to be stored in the contents folder where the contents to be displayed are also stored in addition to the effect achieved by the first preferred embodiment. Therefore, when the right information is displayed in association with the contents, it becomes totally unnecessary to access the user folder/user file. As a result, the right information can be displayed in a speedy manner.

Fourth Preferred Embodiment

Figure 3:
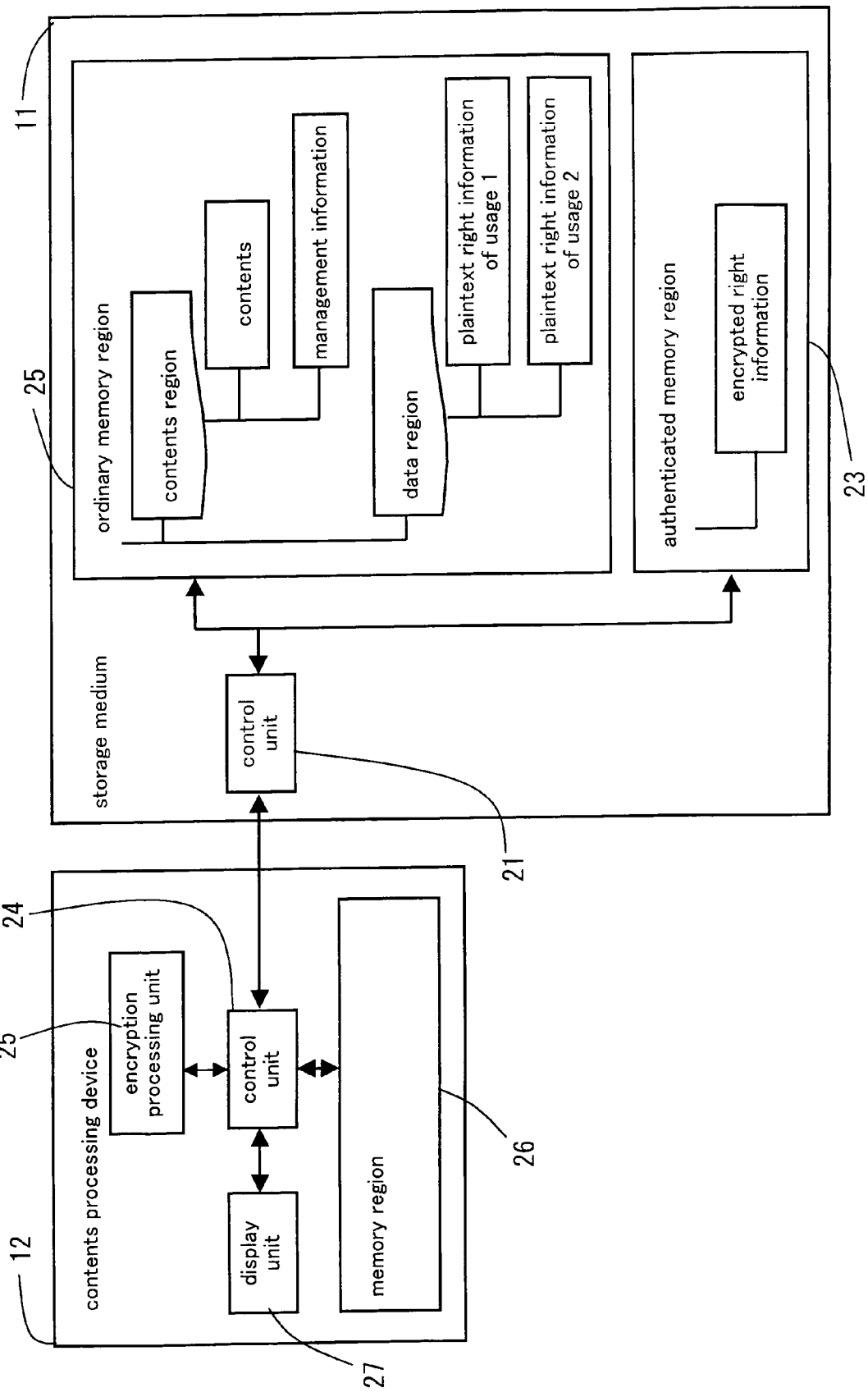
FIG. 3 is a block diagram illustrating a contents right information management method according to claim 4 of the present invention.

A fourth preferred embodiment of the present invention is described. The fourth preferred embodiment corresponds to FIG. 3.

The fourth preferred embodiment is different to the first preferred embodiment only in that the plaintext right information file is divided and managed depending on an application usage when the plaintext right information file is stored in the user folder.

The fourth preferred embodiment is more specifically different to the first preferred embodiment in the generation, display and renewal of the plaintext right information file in the following manner.

Referring to the generation of the plaintext right information file, the Step 68 of the flow chart shown in FIG. 10, that is "the generated plaintext right information is written in the user folder as the plaintext right information file" is replaced by "the generated plaintext right information is divided into files depending on the application usage and written in the user folder as a plaintext right information file of a usage 1 and a plaintext right information file of a usage 2".

Referring to the display of the plaintext right information file, the Step 74 of the flow chart shown in FIG. 12, that is "the plaintext right information file is temporarily read into the memory region of the contents processing device" is replaced by "the plaintext right information files of the usage 1 and the usage 2 are temporarily read into the memory region of the contents processing device depending on the application usage".

Referring to the renewal of the plaintext right information file, the Step 99 of the flow chart shown in FIG. 14, that is "the renewed plaintext right information is written in the ordinary memory region at the original position therein" is replaced by "the renewed plaintext right information file is divided into files depending on the application usage and written in the ordinary memory region at the original position therein as a renewed plaintext right information file of the usage 1 and a renewed plaintext right information file of the usage 2".

In the case of only a plaintext right information file currently present, when the plaintext right information is commonly used for the application usages such as Video, Audio and Document in the mobile telephone 12 and the necessary right information is searched for, for example, the reproduction on the mobile telephone 12, the right information effective for the Video application is searched in the right informations of all of the applications, which is very time consuming. However, according to the method described in the fourth preferred embodiment, only the right information for the Video application can be collected in one plaintext right information file, which is advantageous in speedily displaying the right information without searching the right information effective for the Video application among the right informations of all of the applications, in addition to the effect achieved in the first preferred embodiment.

Fifth Preferred Embodiment

A fifth preferred embodiment of the present invention is described.

The fifth preferred embodiment is different to the fourth preferred embodiment only in that the plaintext right information file is divided and managed depending on a type of the contents processing device when the plaintext right information file is stored in the user folder.

The fifth preferred embodiment is more specifically different to the first preferred embodiment in the generation, display and renewal of the plaintext right information file in the following manner.

Referring to the generation of the plaintext right information file, the Step 68 of the flow chart shown in FIG. 10, that is "the generated plaintext right information is written in the user folder as the plaintext right information file" is replaced by "the generated plaintext right information is divided into files depending on the type of the contents processing device and written in the user folder as a plaintext right information file of an device type 1 and a plaintext right information file of an device type 2".

Referring to the display of the plaintext right information file, the Step 74 of the flow chart shown in FIG. 12, that is "the plaintext right information file is temporarily read into the memory region of the contents processing device" is replaced by "the plaintext right information file of the device type 1 or the device type 2 is temporarily read into the memory region of the contents processing device depending on the type of the contents processing device".

Referring to the renewal of the plaintext right information file, the Step 99 of the flow chart shown in FIG. 14, that is "the renewed plaintext right information file is written in the ordinary memory region at the original position therein" is replaced by "the renewed plaintext right information file is divided into files depending on the type of the contents processing device and written in the ordinary memory region at the original position therein as a renewed plaintext right information files of the device type 1 and the device type 2".

In the case of only a plaintext right information file currently present, when the plaintext right information is commonly used in the contents processing devices such as the mobile telephone 12, television 13, DVD recorder 14 and digital camera 15 and the necessary right information is searched for, for example, the display on the mobile telephone 12, the right information effective for the mobile telephone is searched in the right informations of all of the contents processing devices, which is very time consuming. However, according to the method described in the fifth preferred embodiment, only the right information for the mobile telephone 12 can be collected in one plaintext right information file, which is advantageous in speedily displaying the right information without searching the right information effective for the mobile telephone 12 among the right informations of all of the contents processing devices in addition to the effect achieved in the first preferred embodiment.

Sixth Preferred Embodiment

A sixth preferred embodiment of the present invention is described.

The sixth preferred embodiment is different to the fourth preferred embodiment only in that the plaintext right information file is divided and managed depending on a reproduction format type of the contents when the plaintext right information file is stored in the user folder.

The sixth preferred embodiment is more specifically different to the first preferred embodiment in the generation, display and renewal of the plaintext right information file in the following manner.

Referring to the generation of the plaintext right information file, the Step 68 of the flow chart shown in FIG. 10, that is "the generated plaintext right information is written in the user folder as the plaintext right information file" is replaced by "the generated plaintext right information is divided into files depending on the reproduction format type of the contents and written in the user folder as a plaintext right information file of a format type 1 and a plaintext right information file of a format type 2".

Referring to the display of the plaintext right information file, the Step 74 of the flow chart shown in FIG. 12, that is "the plaintext right information file is temporarily read into the memory region of the contents processing device" is replaced by "the plaintext right information file of the format type 1 or the format type 2 is temporarily read into the memory region of the contents processing device depending on the format type of the contents".

Referring to the renewal of the plaintext right information file, the Step 99 of the flow chart shown in FIG. 14, that is "the renewed plaintext right information file is written in the ordinary memory region at the original position therein" is replaced by "the renewed plaintext right information file is divided into files depending on the reproduction format type of the contents and written in the ordinary memory region at the original position therein as a renewed plaintext right information file of the format type 1 and a renewed plaintext right information file of the format type 2".

In the case of only a plaintext right information currently present, when the plaintext right informations of various formats such as ASF, MP4 and MOD are commonly used as video codecs of the contents in the mobile telephone 12, and the right information necessary for the video-reproduction on the mobile telephone 12 corresponding to only the contents of the MP4 format is searched, the right information of the contents of the MP4 format is searched among the right informations of the contents of the various formats, which is very time consuming. However, according to the method described in the sixth preferred embodiment, the right information of the contents of the MP4 format can be collected in one plaintext right information file, which is advantageous in speedily displaying the right information without searching the right information of the contents of the MP4 format among the right informations of all of the moving-image formats in addition to the effect achieved in the first preferred embodiment.

Seventh Preferred Embodiment

A seventh preferred embodiment of the present invention is described.

The seventh preferred embodiment is different to the first preferred embodiment only in that it is confirmed whether or not the plaintext right information file is registered in a link information with respect to the encrypted right information managed in the management file in the contents folder (or the entire contents management file in the management folder).

The seventh preferred embodiment is more specifically different to the fourth preferred embodiment in the generation, display and renewal of the plaintext right information file in the following manner.

Referring to the generation of the plaintext right information file, the Step 68 of the flow chart shown in FIG. 10, that is "the generated plaintext right information is written in the user folder as the plaintext right information file" is replaced by "in all of the link informations with respect to the encrypted right informations in the generated plaintext right informations, any plaintext right information not registered in the link information with respect to the encrypted right information managed in the management file in the contents folder in the ordinary memory region (or the entire contents management file in the management folder) is removed from the plaintext right information, and the plaintext right information is written in the user folder as the plaintext right information file".

Referring to the renewal of the plaintext right information file, the Step 99 of the flow chart shown in FIG. 14, that is "the renewed plaintext right information file is written in the ordinary memory region at the original position therein" is replaced by "in all of the link informations with respect to the encrypted right informations in the renewed plaintext right informations, any renewed plaintext right information file not registered in the link information with respect to the encrypted right information managed in the management file in the contents folder in the ordinary memory region (or the entire contents management file in the management folder) is removed from the renewed plaintext right information file, and the renewed plaintext right information file is written in the ordinary memory region at the original position therein".

Alternatively, instead of executing the foregoing processes in the generation and renewal of the plaintext right information file, the same effect can be obtained when the process is replaced in the following manner in the display of the plaintext right information file. The Step 86 of the flow chart shown in FIG. 13, that is "the plaintext right information is displayed on the display unit of the contents processing device" is replaced by "in all of the link informations with respect to the encrypted right informations in the obtained plaintext right informations, it is first confirmed whether or not the plaintext right information is registered in the link information with respect to the encrypted right information managed in the management file in the contents folder in the ordinary memory region (or the entire contents management file in the management folder), and the confirmed plaintext right information is displayed on the display unit of the contents processing device".

Because the link information with respect to the encrypted right information in the obtained plaintext right information is not confirmed when the plaintext right information is displayed in the conventional manner, the right information is displayed anyway even if the displayed right information is not registered in the link information with respect to the encrypted right information managed in the management file in the contents folder in the ordinary memory region (or the entire contents management file in the management folder). More specifically, when the process such as the reproduction is actually executed based on the right information, an error is detected because the link information with respect to the encrypted right information is not set (see FIG. 15). The seventh preferred embodiment is advantageous in that only the right information having the established link information relative to the encrypted right information and effectively processable is displayed to the user of the mobile telephone in addition to the effect achieved in the first preferred embodiment. As a result, the user can omit any unnecessary process.

Eighth Preferred Embodiment

An eighth preferred embodiment of the present invention is described.

The eighth preferred embodiment is different to the first preferred embodiment only in that a hash value of the plaintext right information is retained in a memory region on the mobile-telephone side.

The eighth preferred embodiment is more specifically different to the first preferred embodiment in the generation, display and renewal of the plaintext right information file in the following manner.

Referring to the generation of the plaintext right information file, the Step 68 of the flow chart shown in FIG. 10, that is "the generated plaintext right information is written in the user folder as the plaintext right information file" is replaced by "the generated plaintext right information is written in the user folder as the plaintext right information file and the hash value of the plaintext right information is calculated by the encryption processing unit of the mobile telephone and retained in the memory region".

Referring to the display of the plaintext right information file, the Step 74 of the flow chart shown in FIG. 12, that is "the plaintext right information file is temporarily read into the memory region of the contents processing device" is replaced by "the plaintext right information file is temporarily read into the memory region of the contents processing device, and the hash value of the read plaintext right information is calculated by the encryption processing unit of the mobile telephone and checked if the hash value coincides with a hash value previously retained in the memory region. The process is terminated if there is any difference therebetween".

Referring to the renewal of the plaintext right information file, the Step 99 of the flow chart shown in FIG. 14, that is "the renewed plaintext right information file is temporarily written into the ordinary memory region at the original position therein" is replaced by "the renewed plaintext right information file is temporarily written in the ordinary memory region at the original position therein, and the hash value of the plaintext right information is calculated by the encryption processing unit of the mobile telephone and retained in the memory region".

In the foregoing manner, there is no longer the risk that the plaintext right information file 39 stored in the ordinary memory region 22 could be falsified by the user of the mobile telephone, and it becomes totally unnecessary to access the authenticated memory region 23 and decode the encrypted right information, which were demanded in the conventional method. As a result, the display of the right information can be accelerated.

Ninth Preferred Embodiment

Figure 16:
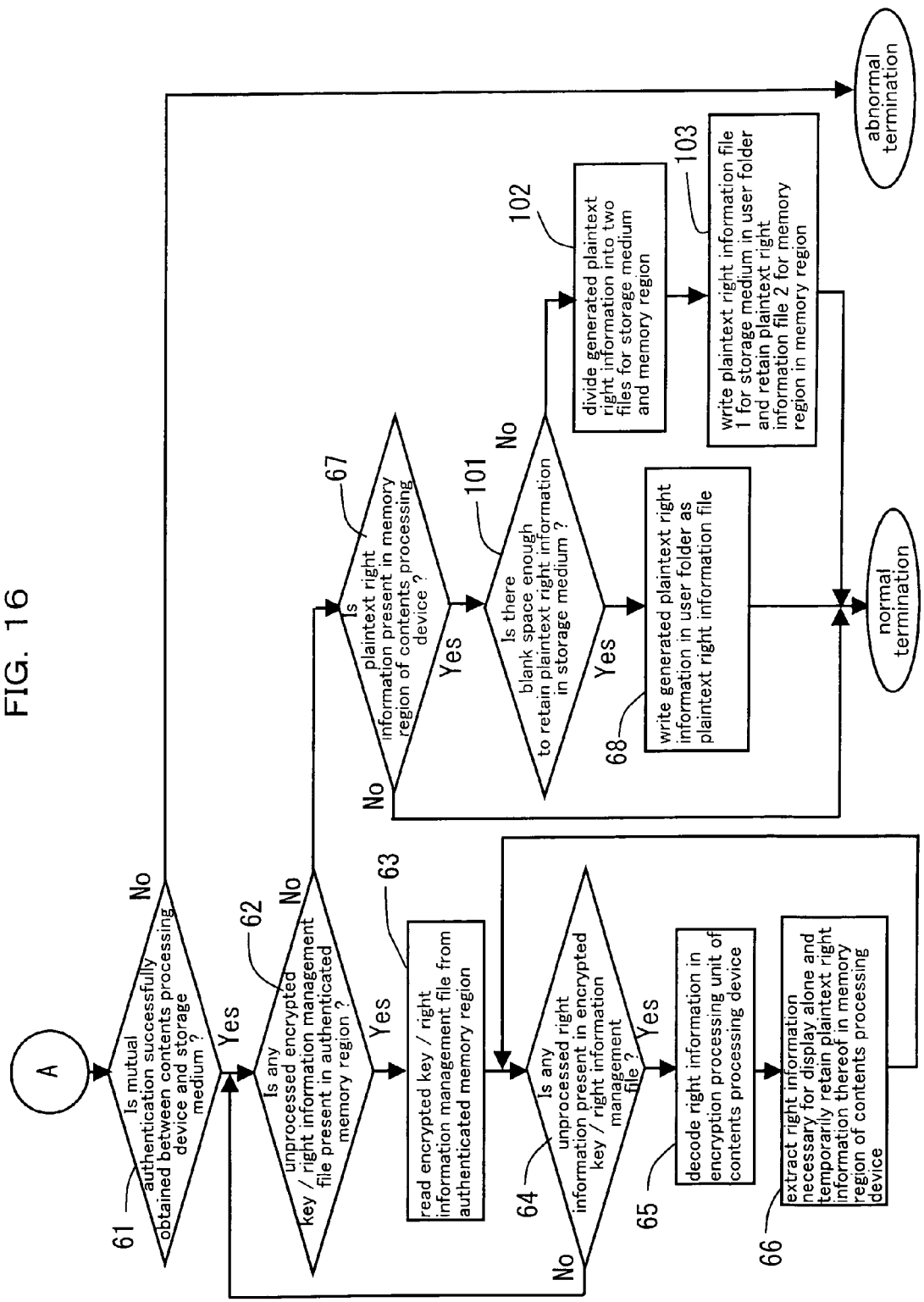
FIG. 16 is a flow chart of dividing and generating a plaintext right information file according to a ninth preferred embodiment of the present invention.

A ninth preferred embodiment of the present invention is described referring to FIG. 16.

The ninth preferred embodiment is different to the first preferred embodiment only in that the plaintext right information file is divided in accordance with a capacity of the memory card and separately retained in the user folder of the memory card and the memory region of the mobile telephone.

The ninth preferred embodiment is more specifically different to the first preferred embodiment in the generation, display and renewal of the plaintext right information file in the following manner.

Referring to the generation of the plaintext right information file, the Step 68 of the flow chart shown in FIG. 10, that is "the generated plaintext right information is written in the user folder as the plaintext right information file" is replaced by "it is checked if there is any blank region enough to retain the plaintext right information in the memory card 11 (see FIG. 16) (Step 101). In the presence of the blank space in the memory card 11, the generated plaintext right information is written in the user folder 37 as the plaintext right information file 39 (Step 68). In the absence of any blank space in the memory card 11, or when there is an intention to divide the plaintext right information file 39, the generated plaintext right information file 39 is divided into a plaintext right information file 1 for memory card and a plaintext right information 2 for mobile-telephone memory (Step 102). Then, the generated plaintext right information is written in the user folder 37 as the plaintext right information file 1 and retained in the memory region 26 of the mobile telephone 12 as the plaintext right information file 2 (Step 103).

Referring to the display of the plaintext right information file, the Step 74 of the flow chart shown in FIG. 12, that is "the plaintext right information file is temporarily read into the memory region of the contents processing device" is replaced by "the plaintext right information file 1 is temporarily read into the memory region of the contents processing device, and the plaintext right information file 2 retained in the memory region of the contents processing device is read so that the two files are combined into the plaintext right information file".

Referring to the renewal of the plaintext right information file, the Step 99 of the flow chart shown in FIG. 14, that is "the renewed plaintext right information file is written in the ordinary memory region at the original position therein" is replaced by "it is checked if there is any blank space enough to retain the plaintext right information in the memory card; the renewed plaintext right information file is written in the ordinary memory region at the original position therein in the presence of the blank space in the memory card; the renewed plaintext right information file is divided into a renewed plaintext right information file 1 for memory card and a renewed plaintext right information file 2 for the memory region of the contents processing device when the blank space is not found in the memory card or the renewed plaintext right information file is intentionally divided; and the renewed plaintext right information file 1 is written in the ordinary memory region at the original position therein and the renewed plaintext right information file 2 is retained in the memory region of the contents processing device".

In the foregoing manner, the plaintext right information file 39 can be generated even in the case where the blank space cannot be assured in the user folder 37 of the memory card 11 in addition to the effect achieved in the first preferred embodiment.

Tenth Preferred Embodiment

Figure 4:
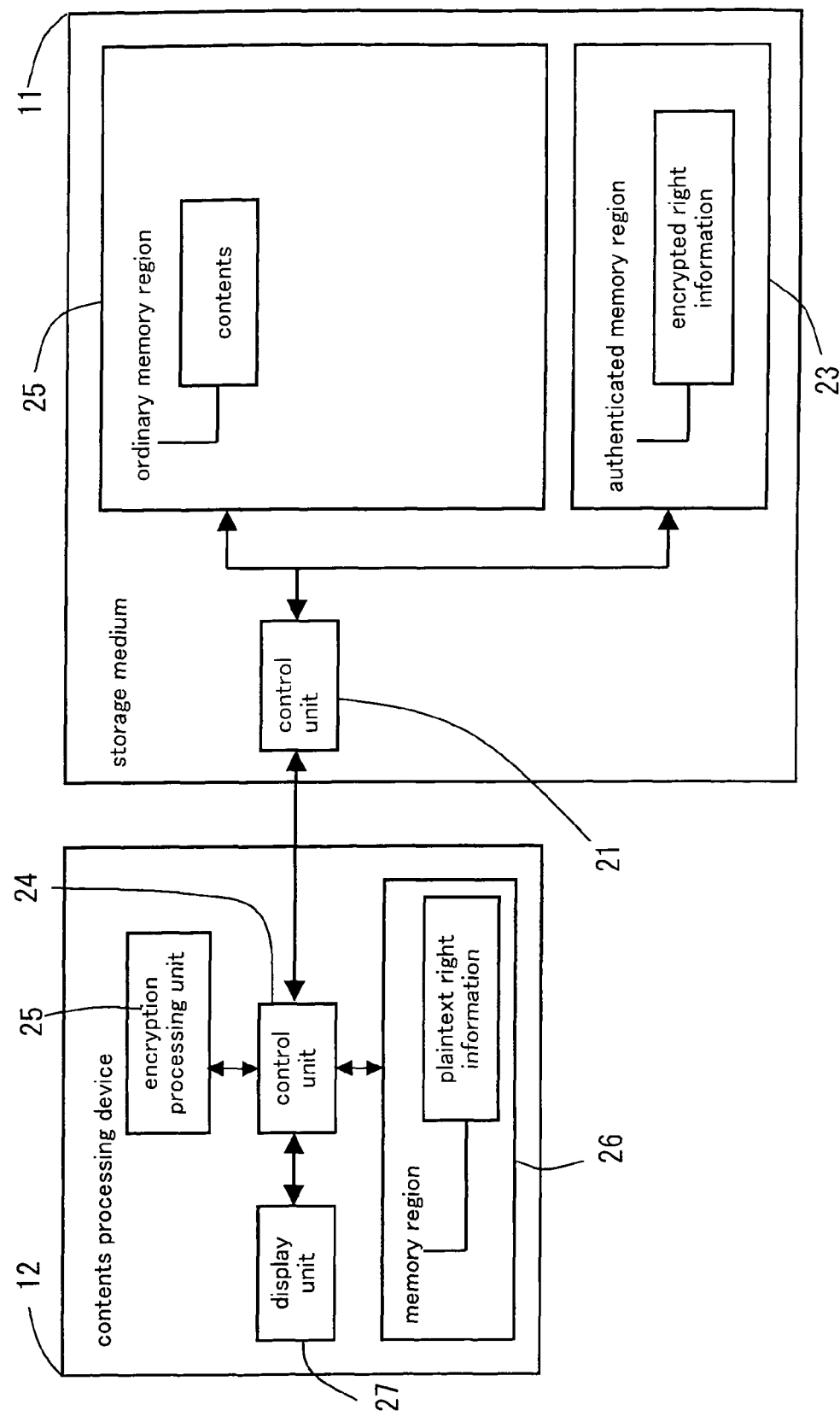
FIG. 4 is a block diagram illustrating a contents right information management method according to claim 10 of the present invention.

A tenth preferred embodiment of the present invention is described. The tenth preferred embodiment corresponds to FIG. 4.

The tenth preferred embodiment is different to the first preferred embodiment only in that the plaintext right information file is not written in the user folder of the memory card but retained in the memory region of the mobile telephone.

The tenth preferred embodiment is more specifically different to the first preferred embodiment in the generation, display and renewal of the plaintext right information file in the following manner.

Referring to the generation of the plaintext right information file, the Step 68 of the flow chart shown in FIG. 10, that is "the generated plaintext right information is written in the user folder as the plaintext right information file" is replaced by "the generated plaintext right information is retained in the memory region of the contents processing device as the plaintext right information file".

Referring to the display of the plaintext right information file, all of the processes of the flow chart shown in FIG. 12 become unnecessary.

Referring to the renewal of the plaintext right information file, the Step 99 of the flow chart shown in FIG. 14, that is "the renewed plaintext right information file is written in the ordinary memory region at the original position therein" is replaced by "the renewed plaintext right information file is retained in the memory region of the contents processing device".

In the foregoing manner, in addition to the effect achieved in the first preferred embodiment, it becomes unnecessary to read the plaintext right information file from the memory card 11 at a predetermined position therein, which further accelerates the display of the right information.

11th Preferred Embodiment

An 11th preferred embodiment of the present invention is described.

The 11th preferred embodiment is different to the tenth preferred embodiment only in that the plaintext right information file is divided and managed depending on the reproduction format type of the contents in storing the plaintext right information file in the memory region of the mobile telephone.

The 11th preferred embodiment is more specifically different to the first preferred embodiment in the generation, display and renewal of the plaintext right information file in the following manner.

Referring to the generation of the plaintext right information file, the Step 68 of the flow chart shown in FIG. 10, that is "the generated plaintext right information is written in the user folder as the plaintext right information file" is replaced by "the generated plaintext right information is divided into files depending on the reproduction format type of the contents and retained in the memory region of the contents processing device as the plaintext right information file of the format type 1 and the plaintext right information file of the format type 2".

Referring to the display of the plaintext right information file, all of the processes of the flow chart shown in FIG. 12, except for the Step 74, become unnecessary.

Referring to the renewal of the plaintext right information file, the Step 99 of the flow chart shown in FIG. 14, that is "the renewed plaintext right information file is written in the ordinary memory region at the original position therein" is replaced by "the generated plaintext right information file is divided into files depending on the reproduction format type of the contents and retained in the memory region of the contents processing device as the renewed plaintext right information file of the format type 1 and the renewed plaintext right information file of the format type 2".

In the case of only a plaintext right information currently present, when the plaintext right informations of the various formats such as ASF, MP4 and MOD are commonly used as the video codecs of the contents in the mobile telephone 12, and the right information necessary for the video-reproduction on the mobile telephone 12 corresponding to only the contents of the MP4 format is searched, the right information of the contents of the MP4 format is searched among the right informations of the contents of the various formats, which is very time consuming. However, according to the method described in the 11th preferred embodiment, the right information of the contents of the MP4 format can be collected in one plaintext right information file, which is advantageous in speedily displaying the right information without searching the right information of the contents of the MP4 format among the right informations of all of the moving-image formats, in addition to the effect achieved in the tenth preferred embodiment.

12th Preferred Embodiment

Figure 5:
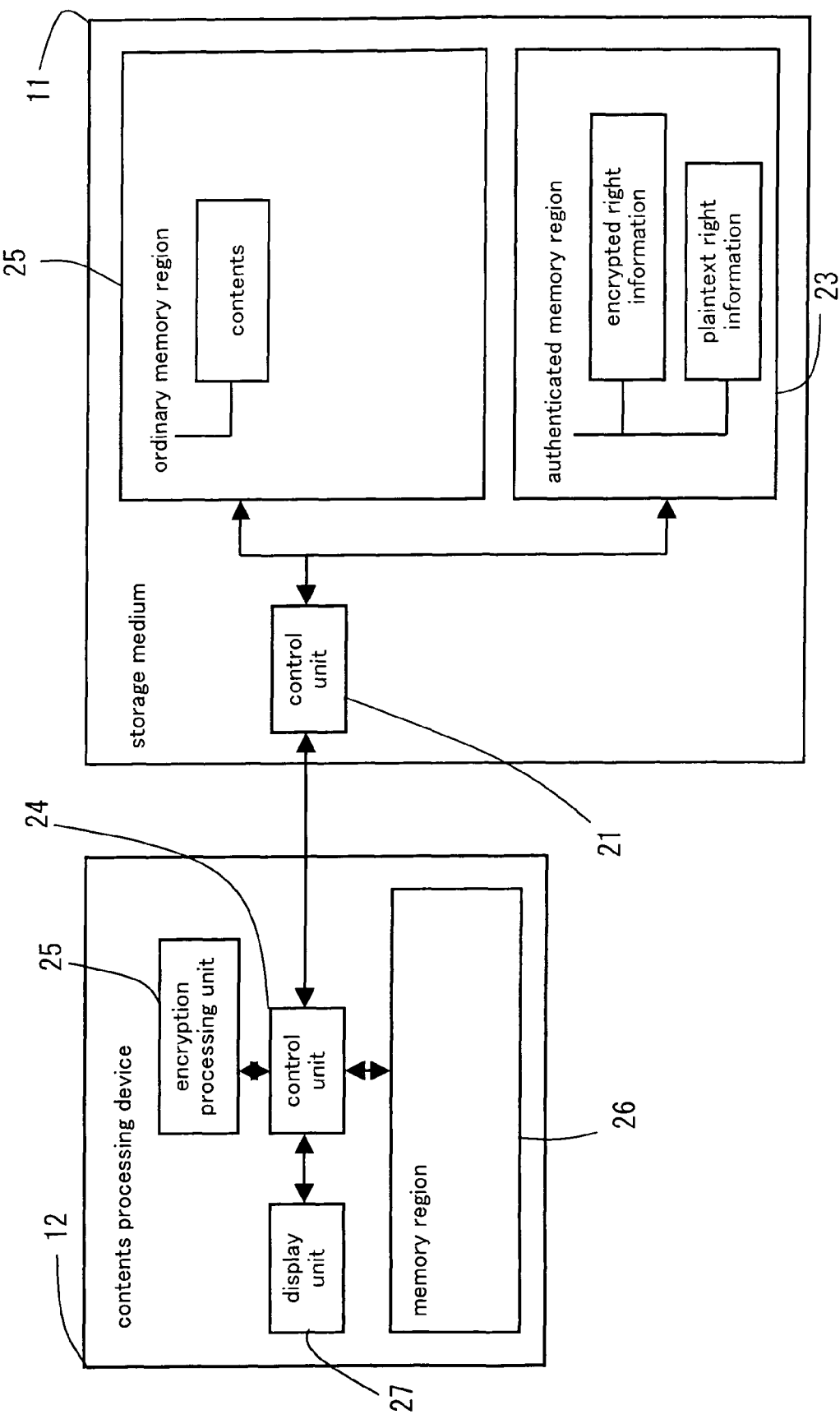
FIG. 5 is a block diagram illustrating a contents right information management method according to claim 12 of the present invention.

A 12th preferred embodiment of the present invention is described. The 12th preferred embodiment corresponds to FIG. 5.

The 12th preferred embodiment is different to the first preferred embodiment only in that the plaintext right information file is written, not in the user folder in the ordinary memory region in the memory card, but in the authenticated memory region directly in the form of the plaintext.

The 12th preferred embodiment is more specifically different to the first preferred embodiment in the generation, display and renewal of the plaintext right information file in the following manner.

Referring to the generation of the plaintext right information file, the Step 68 of the flow chart shown in FIG. 10, that is "the generated plaintext right information is written in the user folder as the plaintext right information file" is replaced by "the plaintext right information is written in the authenticated memory region as the plaintext right information file directly in the form of the plaintext".

Referring to the display of the plaintext right information file, the Step 74 of the flow chart shown in FIG. 12, that is "the plaintext right information file is temporarily read into the memory region of the contents processing device" is replaced by "the plaintext right information file is temporarily read into the memory region of the contents processing device after the mutual authentication is successfully obtained between the contents processing device and the storage medium.

Referring to the renewal of the plaintext right information file, the Step 99 of the flow chart shown in FIG. 14, that is "the renewed plaintext right information file is written in the ordinary memory region at the original position" is replaced by "the renewed plaintext right information file is written in the authenticated memory region directly in the form of the plaintext.

In the foregoing manner, in addition to the effect achieved in the first preferred embodiment, there is no longer the risk that the plaintext right information file stored in the authenticated memory region may be read or falsified by the user of the mobile telephone, and it becomes totally unnecessary to decode the encrypted right information, which was demanded in the conventional method. Therefore, the display of the right information can be accelerated.

13th Preferred Embodiment

A 13th preferred embodiment of the present invention is described. The 13th preferred embodiment corresponds to FIGS. 17 and 18.

Figure 17:
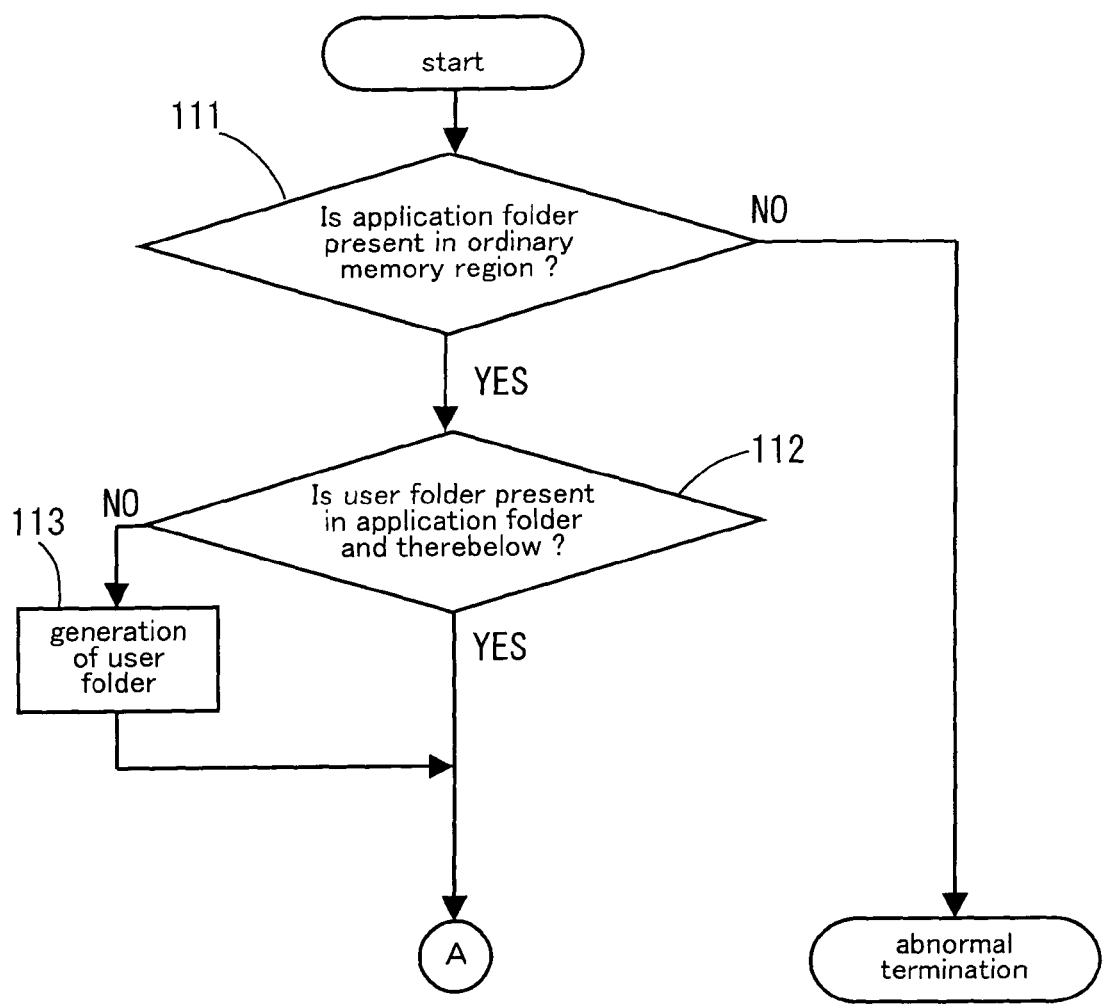
FIG. 17 is a flow chart of presence check when a plaintext right information file according to a 13th preferred embodiment of the present invention is generated.
Figure 18:
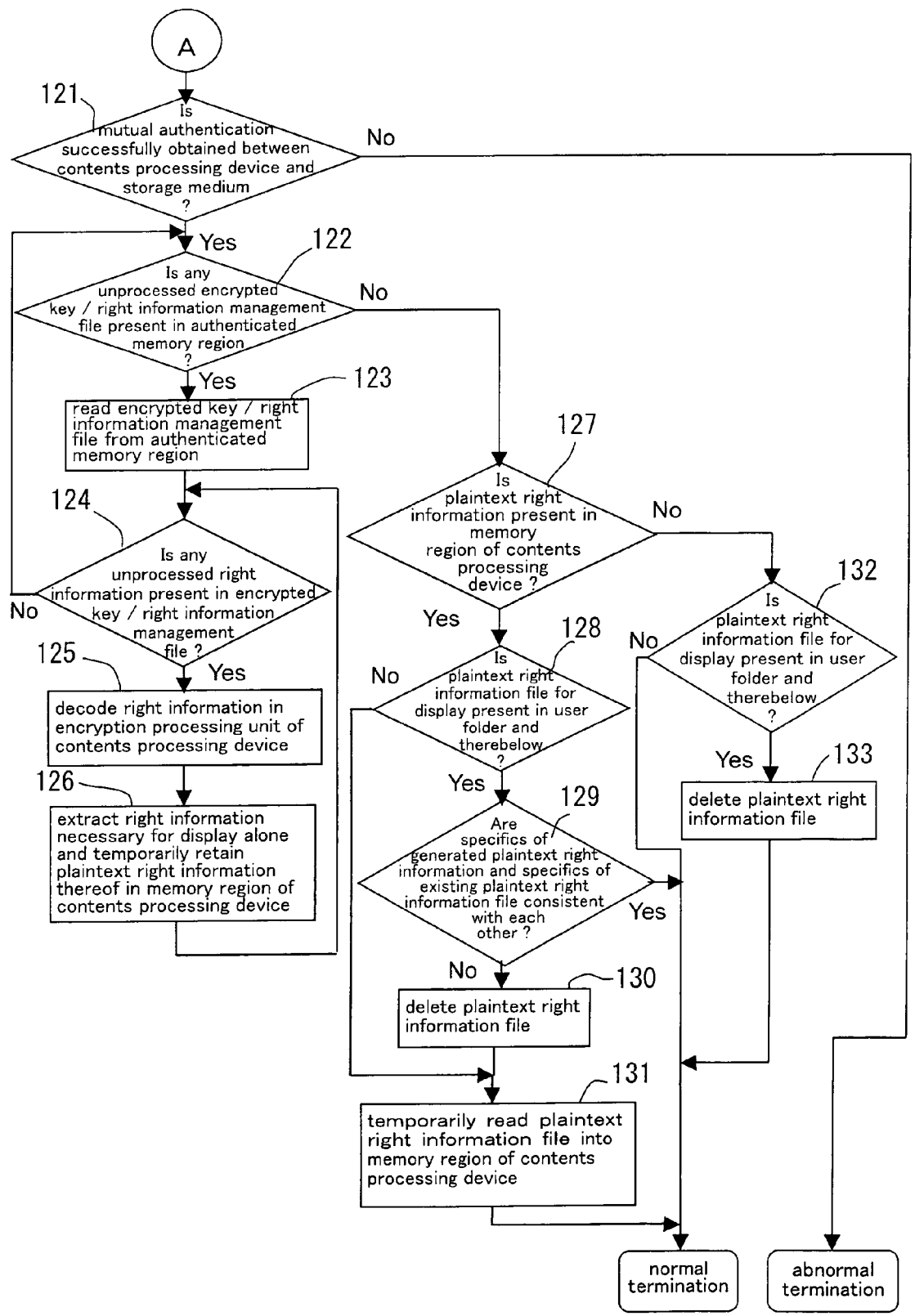
FIG. 18 is a flow chart of generating the plaintext right information file according to the 13th preferred embodiment.

The 13th preferred embodiment is different to the first preferred embodiment only in that the presence of the plaintext right information file is not checked in the process of checking the presence of the plaintext right information file as shown in FIG. 17 but is checked in the process of generating the plaintext right information file as shown in FIG. 18, and it is checked whether or not the generated plaintext right information is consistent with the existing plaintext right information file, and the generated plaintext right information is prioritized over the existing plaintext right information file when the inconsistency is detected so that the existing plaintext right information file is thereby renewed. The rest of the constitution according to the present embodiment is not any different to that of the first preferred embodiment.

First, the process of checking the presence of the plaintext right information file, which is shown in FIG. 17, is described.

When the generation of the plaintext right information on the memory card 11 is requested by the mobile telephone 12, the presence/absence of the application folder 31 in the ordinary memory region 22 of the memory card 11 is first checked (Step 111). When the absence of the application folder 31 is confirmed in the Step 111, the process is immediately terminated as the abnormality error. When it is confirmed that the application folder 31 is present, the process advances to Step 112. It is checked in the Step 112 whether or not the user folder 37 is present in the application folder 31 and therebelow. In the absence of the user folder 37, the user folder is newly generated (Step 113). In the present embodiment, the presence/absence of the plaintext right information file in the user folder and therebelow is not checked.

Next, the process of generating the plaintext right information file, which is shown in FIG. 18, is described.

The mutual authentication defined in the Standards is carried out between the mobile telephone 12 and the memory card 11 so that it is confirmed that the memory card 11 is legitimate (Step 121). When the memory card 11 is judged not to be legitimate in the Step 121, the process is immediately interrupted as the abnormality error. When the memory card 11 is judged to be legitimate in the Step 121, the process advances to Step 122 so that the presence/absence of any unprocessed encrypted key/right information management file 43 in the authenticated memory region 23 of the memory card 11 is checked. When the presence of the encrypted key/right information management file 43 is confirmed in the Step 122, the process advances to Step 123, in which the encrypted key/right information management file 43 is read into the memory region 26 via the control unit 24 of the mobile telephone 12. At the time, the encrypted key/right information management file 43 may be divided into appropriate sizes and read instead of reading the entirety of the relevant file. When the encrypted key/right information management file 43 is not found at all, there is not particular processing to be executed.

When the encrypted key/right information management file 43 is normally read in the Step 123, the effective encrypted key/right information in the encrypted key/right information management file 43 is confirmed by the control unit 24 of the mobile telephone 12. In the absence of the effective encrypted key/right information, the process is terminated. In the presence of the effective encrypted key/right information, the process advances to Step 124, in which the presence/absence of the unprocessed encrypted right information in the effective encrypted key/right information is checked. When it is confirmed that the unprocessed encrypted right information is present in the Step 124, the process advances to Step 125, in which the encrypted right information is decoded using the encryption processing unit 25 of the mobile telephone 12 so that the plaintext right information is retrieved. Further, only the right information necessary for the display is extracted from the retrieved plaintext right information, and the extracted right information is retained in the memory region 26 of the mobile telephone 12 as a group of plaintext right informations (Step 126).

Next, the presence/absence of any other encrypted key/right information in the encrypted key/right information management file 43 is checked, and the process of obtaining the plaintext right information is carried out and the group of plaintext right informations in the memory region 26 of the mobile telephone 12 is repeatedly renewed and retained until all of the encrypted right informations are obtained. In the case where there is any other encrypted key/right information management file 43, the relevant encrypted key/right information management file 43 is read and the plaintext right information is obtained therefrom as described, and the group of plaintext right informations in the memory region 26 of the mobile telephone 12 is repeatedly renewed and retained. The foregoing process of obtaining the plaintext right information is repeated until the plaintext right information is obtained from all of the encrypted key/right informations and all of the encrypted key/right information management files 43.

When the repeated process is finally terminated, the process advances to Step 127, in which the presence/absence of the plaintext right information file for the display in the user folder and therebelow is checked when the plaintext right information is present in the memory region 26 of the mobile telephone 12 (Step 128). When the plaintext right information file for the display is already present, the specifics of the obtained plaintext right information and the specifics of the plaintext right information file are compared to each other (Step 129). When the plaintext right information file for the display is not present, all of the groups of the plaintext right informations retained in the memory region 26 of the mobile telephone 12 are compiled into one plaintext right information file 39 and recorded in the user folder 37 in the application folder 31 and therebelow in the memory card 11 via the control unit 24 of the mobile telephone 12 in the same manner as in the first preferred embodiment (Step 131).

When there is no difference in the compared specifics in the Step 129, the process is normally terminated. However, in the case of any difference, the plaintext right information file for the display is deleted (Step 130), and all of the groups of the plaintext right informations retained in the memory 26 of the mobile telephone 12 are compiled into one plaintext right information file 39 again and recorded in the user folder 37 in the application folder 31 and therebelow in the memory card 11 via the control unit 24 of the mobile telephone 12 (Step 131). The plaintext right information file for the display is deleted in the present embodiment, however, the file is not necessarily deleted. Alternatively, any difference in the specifics may be extracted so that the plaintext right information file can be renewed.

Further, when the plaintext right information is not present in the memory 26 of the mobile telephone 12 because the effective right information cannot be found or the like, the presence/absence of the plaintext right information file for the display in the user folder and therebelow is checked (Step 132). Then, when the plaintext right information file for the display is present, the plaintext right information file for the display is deleted because any inconsistency is detected between the obtained plaintext right information and the plaintext right information file (Step 133). In the absence of the plaintext right information file for the display, the process is normally terminated.

While there has been described what is at present considered to be preferred embodiments of this invention, it will be understood that various modifications may be made therein, and it is intended to cover in the appended claims all such modifications as fall within the true spirit and scope of this invention.

What is claimed is:

1. A right information management method for managing a right information of contents retained in a storage medium comprising an authenticated memory region accessible after a mutual authentication is obtained relative to a contents processing device and an ordinary memory region accessible without obtaining the mutual authentication, comprising:

a step of reading an encrypted right information retained in the authenticated memory region;

a step of decoding the read encrypted right information and retrieving a plaintext right information; and a step of retaining the plaintext right information in the ordinary memory region.

2. A right information management method as claimed in claim 1, wherein the plaintext right information is encrypted and retained in the ordinary memory region.

3. A right information management method as claimed in claim 1, wherein the ordinary memory region comprises:

a contents region managed and accessible depending on a usage; and a data region capable of retaining data irrespective of the usage, and the contents and a management information of the contents are stored in the contents region and the plaintext right information is retained in the management information in the contents region.

4. A right information management method as claimed in claim 3, wherein the contents region is defined by SD-Video Standards, SD-Audio Standards, SD-Binding Standards and the like of a SD memory card.

5. A right information management method as claimed in claim 1, wherein the ordinary memory region comprises a contents region managed and accessible depending on a usage; and a data region capable of retaining data irrespective of the usage, and the contents and a management information of the contents are retained in the contents region, and the plaintext right information is divided and retained in the data region depending on a usage employed on the contents-processing-device side.

6. A right information management method as claimed in claim 5, wherein the plaintext right information is divided depending on a type of the contents processing device and retained.

7. A right information management method as claimed in claim 5, wherein the plaintext right information is divided depending on a format type of the contents and retained.

8. A right information management method as claimed in claim 5, wherein the contents region is defined by SD-Video Standards, SD-Audio Standards, SD-Binding Standards and the like of a SD memory card.

9. A right information management method as claimed in claim 1, wherein a hash value of the plaintext right information is retained in a memory region of the contents processing device.

10. A right information management method as claimed in claim 1, wherein
the plaintext right information is renewed in the contents processing device so as to create a renewed plaintext right information, the renewed plaintext right information is encrypted so as to renew the encrypted right information in the authenticated memory region, and the plaintext right information retained in the memory region is renewed based on the renewed plaintext right information.

11. A right information management method as claimed in claim 1, wherein
specifics of the plaintext right information previously retained in the memory region are compared to specifics of the retrieved plaintext right information obtained by decoding the encrypted right information retained in the authenticated memory region, and the specifics of the plaintext right information in the memory region are renewed based on the retrieved plaintext right information obtained by decoding the encrypted right information retained in the authenticated memory region when the compared specifics are inconsistent with each other.

12. A right information management method for managing a right information of contents retained in a storage medium comprising an authenticated memory region accessible after a mutual authentication is obtained relative to a contents processing device and an ordinary memory region accessible without obtaining the mutual authentication, wherein
the ordinary memory region comprises:
a contents region managed and accessible based on a usage; and
a data region capable of retaining data irrespective of the usage, and the contents and a management information of the contents are retained in the contents region, comprising:
a step of confirming the presence of the contents and a management information of the contents including a link information relative to an encrypted right information in the contents region;
a step of reading the encrypted right information retained in the authenticated memory region based on the link information when the presence of the management information is confirmed;
a step of decoding the read encrypted right information and retrieving a plaintext right information; and
a step of retaining the plaintext right information in the ordinary memory region.

13. A right information management method as claimed in claim 12, wherein the contents region is defined by SD-Video Standards, SD-Audio Standards, SD-Binding Standards and the like of a SD memory card.

14. A right information management method as claimed in claim 12, wherein
the plaintext right information is renewed in the contents processing device so as to create a renewed plaintext right information, the renewed plaintext right information is encrypted so as to renew the encrypted right information in the authenticated memory region, and the plaintext right information retained in the memory region is renewed based on the renewed plaintext right information.

15. A right information management method as claimed in claim 12, wherein
specifics of the plaintext right information previously retained in the memory region are compared to specifics of the retrieved plaintext right information obtained by decoding the encrypted right information retained in the authenticated memory region, and the specifics of the plaintext right information in the memory region are renewed based on the retrieved plaintext right information obtained by decoding the encrypted right information retained in the authenticated memory region when the compared specifics are inconsistent with each other.

16. A right information management method for managing a right information of contents retained in a storage medium comprising an authenticated memory region accessible after a mutual authentication is obtained relative to a contents processing device and an ordinary memory region accessible without obtaining the mutual authentication, comprising:
a step of reading an encrypted right information retained in the authenticated memory region;
a step of decoding the read encrypted right information and retrieving a plaintext right information;
a step of confirming a blank region in the storage medium for retaining the plaintext right information;
a step of dividing the plaintext right information into a plaintext right information 1 having a size retainable in the storage medium and a plaintext right information 2 when the blank region of the storage medium is insufficient;
a step of retaining the plaintext right information 1 in the ordinary memory region; and
a step of retaining the plaintext right information 2 in a memory region of the contents processing device.

17. A right information management method as claimed in claim 16 wherein
the plaintext right information is renewed in the contents processing device so as to create a renewed plaintext right information, the renewed plaintext right information is encrypted so as to renew the encrypted right information in the authenticated memory region, and the plaintext right information retained in the memory region is renewed based on the renewed plaintext right information.

18. A right information management method as claimed in claim 16, wherein
specifics of the plaintext right information previously retained in the memory region are compared to specifics of the retrieved plaintext right information obtained by decoding the encrypted right information retained in the authenticated memory region, and the specifics of the plaintext right information in the memory region are renewed based on the retrieved plaintext right information obtained by decoding the encrypted right information retained in the authenticated memory region when the compared specifics are inconsistent with each other.

19. A right information management method for managing a right information of contents retained in a storage medium comprising an authenticated memory region accessible after a mutual authentication is obtained relative to a contents processing device and an ordinary memory region accessible without obtaining the mutual authentication, comprising:

a step of reading an encrypted right information retained in the authenticated memory region;

a step of decoding the read encrypted right information and retrieving a plaintext right information; and a step of retaining the plaintext right information in a memory region of the contents processing device.

20. A right information management method as claimed in claim 19, wherein the plaintext right information is divided depending on a format type of the contents and retained.

21. A right information management method as claimed in claim 19, wherein the plaintext right information is renewed in the contents processing device so as to create a renewed plaintext right information, the renewed plaintext right information is encrypted so as to renew the encrypted right information in the authenticated memory region, and the plaintext right information retained in the memory region is renewed based on the renewed plaintext right information.

22. A right information management method as claimed in claim 19, wherein specifics of the plaintext right information previously retained in the memory region are compared to specifics of the retrieved plaintext right information obtained by decoding the encrypted right information retained in the authenticated memory region, and the specifics of the plaintext right information in the memory region are renewed based on the retrieved plaintext right information obtained by decoding the encrypted right information retained in the authenticated memory region when the compared specifics are inconsistent with each other.

23. A right information management method for managing a right information of contents retained in a storage medium comprising an authenticated memory region accessible after a mutual authentication is obtained relative to a contents processing device and an ordinary memory region accessible without obtaining the mutual authentication, comprising:

a step of reading an encrypted right information retained in the authenticated memory region;

a step of decoding the read encrypted right information and retrieving a plaintext right information; and a step of retaining the plaintext right information in the authenticated memory region in the form of the plaintext.

24. A right information management method as claimed in claim 23, wherein the plaintext right information is renewed in the contents processing device so as to create a renewed plaintext right information, the renewed plaintext right information is encrypted so as to renew the encrypted right information in the authenticated memory region, and the plaintext right information retained in the memory region is renewed based on the renewed plaintext right information.

25. A right information management method as claimed in claim 23, wherein specifics of the plaintext right information previously retained in the memory region are compared to specifics of the retrieved plaintext right information obtained by decoding the encrypted right information retained in the authenticated memory region, and the specifics of the plaintext right information in the memory region are renewed based on the retrieved plaintext right information obtained by decoding the encrypted right information retained in the authenticated memory region when the compared specifics are inconsistent with each other.

26. A right information management device for managing a right information of contents retained in a storage medium comprising an authenticated memory region accessible after a mutual authentication is obtained relative to a contents processing device and an ordinary memory region accessible without obtaining the mutual authentication, comprising:

a device for reading an encrypted right information retained in the authenticated memory region;

a device for decoding the read encrypted right information and retrieving a plaintext right information; and a device for retaining the plaintext right information in the ordinary memory region.

27. A right information management device for managing a right information of contents retained in a storage medium comprising an authenticated memory region accessible after a mutual authentication is obtained relative to a contents processing device and an ordinary memory region accessible without obtaining the mutual authentication, comprising:

a device for reading an encrypted right information retained in the authenticated memory region;

a device for decoding the read encrypted right information and retrieving a plaintext right information; and a device for retaining the plaintext right information in a memory region of the contents processing device.

28. A right information management device for managing a right information of contents retained in a storage medium comprising an authenticated memory region accessible after a mutual authentication is obtained relative to a contents processing device and an ordinary memory region accessible without obtaining the mutual authentication, comprising:

a device for reading an encrypted right information retained in the authenticated memory region;

a device for decoding the read encrypted right information and retrieving a plaintext right information; and a device for retaining the plaintext right information in the authenticated memory region in the form of the plaintext.

* * * * *